(12) United States Patent
Choi et al.

(10) Patent No.: US 12,507,521 B2
(45) Date of Patent: Dec. 23, 2025

(54) LIGHT EMITTING DIODE USING ZINC OXIDE-AMINOPYRENE CORE-SHELL QUANTUM DOTS

(71) Applicant: KOREA INSTITUTE OF SCIENCE AND TECHNOLOGY, Seoul (KR)

(72) Inventors: Won-Kook Choi, Seoul (KR); Hong Hee Kim, Seoul (KR); Yong-Won Song, Seoul (KR); Soohyung Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 428 days.

(21) Appl. No.: 18/311,454

(22) Filed: May 3, 2023

(65) Prior Publication Data

US 2023/0363194 A1 Nov. 9, 2023

(30) Foreign Application Priority Data

May 3, 2022 (KR) ........................ 10-2022-0054562

(51) Int. Cl.
| | | |
|---|---|---|
| *H10K 50/115* | (2023.01) | |
| *H10K 85/30* | (2023.01) | |
| *B82Y 20/00* | (2011.01) | |
| *H10K 101/30* | (2023.01) | |

(52) U.S. Cl.
CPC ......... *H10K 50/115* (2023.02); *H10K 85/381* (2023.02); *B82Y 20/00* (2013.01); *H10K 2101/30* (2023.02)

(58) Field of Classification Search
None
See application file for complete search history.

(56) References Cited

U.S. PATENT DOCUMENTS

| 10,361,241 B2 | 7/2019 | Bessho et al. |
| 2015/0076469 A1 | 3/2015 | Ikemizu et al. |
| 2018/0239245 A1 | 8/2018 | Yang et al. |

FOREIGN PATENT DOCUMENTS

| EP | 3 309 236 B1 | 11/2019 |
| KR | 10-1462901 B1 | 11/2014 |
| KR | 10-2014-0143406 A | 12/2014 |
| KR | 10-2016-0150500 A | 12/2016 |
| KR | 10-1695442 B1 | 1/2017 |
| KR | 10-2018-0096535 A | 8/2018 |
| KR | 10-2072438 B1 | 2/2020 |

OTHER PUBLICATIONS

Kim, Hong Hee, et al. "Realization of excitation wavelength independent blue emission of ZnO quantum dots with intrinsic defects." *ACS Photonics* 7.3 (2020): 723-734.
Kim, Taehyung, et al. "Efficient and stable blue quantum dot light-emitting diode." *Nature* 586.7829 (2020): 385-389.
Kim, Hong Hee, et al. "Blue-Light Emissive Type II ZnO@ 5-Amino-2-Naphthalene Sulfonic Acid Core—Shell Quantum Dots." *Advanced Photonics Research* 3.4 (2022): 2100315.
Pu, Chaodan, et al. "Electrochemically-stable ligands bridge the photoluminescence-electroluminescence gap of quantum dots." *Nature Communications* 11.1 (2020): 937.

*Primary Examiner* — Anthony Ho
(74) *Attorney, Agent, or Firm* — NSIP Law

(57) ABSTRACT

Disclosed is a light emitting diode using zinc oxide-aminopyrene core-shell quantum dots capable of improving the purity of blue light emission and securing long lifetime through the characteristic that emission transition of electrons proceeds in aminopyrene by applying the zinc oxide-aminopyrene quantum dots forming a core-shell structure with zinc oxide (ZnO) and 1-aminopyrene to the light emitting diode. The light emitting diode using the zinc oxide-aminopyrene core-shell quantum dots comprises a bule light-emitting layer of the ZnO@1-aminopyrene quantum dots having a core-shell structure in which ZnO quantum dots form a core, and 1-aminopyrene forms a shell.

6 Claims, 34 Drawing Sheets

LIGHT EMITTING DIODE USING ZINC OXIDE-AMINOPYRENE CORE-SHELL QUANTUM DOTS

CROSS REFERENCE TO RELATED APPLICATION

The present application claims priority to Korean Patent Application No. 10-2022-0054562, filed May 3, 2022, the entire contents of which are incorporated herein by reference.

BACKGROUND OF THE INVENTION

Description of Government-Supported Research and Development

This research was conducted at the Korea Institute of Science and Technology under the management of the Korea Institute of Science and Technology under the Ministry of Science and ICT. The research project name is Support for research operation expenses (main project expense) for Korea Institute of Science and Technology, and the research task name is a (photon-atom-based) quantum computer technology development project (Task identification number: 1711173298).

In addition, this research was conducted by the Korea Institute of Science and Technology under the management of the National Research Foundation under the Ministry of Science and ICT. The research project name is Science and Engineering Academic Research Base Establishment (R&D), and the research task name is synthesis of new composite quantum dots through zinc oxide-polycyclic aromatic hydrocarbon bonds, identification of light emitting mechanism, and development of blue light emitting diode using the same (Task identification number: 1345341636).

FIELD OF THE INVENTION

The disclosure relates to a light emitting diode using zinc oxide-aminopyrene core-shell quantum dots, and more particularly, to a light emitting diode using zinc oxide-aminopyrene core-shell quantum dots capable of improving the purity of blue light emission and securing long lifetime through the characteristic that emission transition of electrons proceeds in aminopyrene by applying the zinc oxide-aminopyrene quantum dots forming a core-shell structure with zinc oxide (ZnO) and 1-aminopyrene to the light emitting diode.

DESCRIPTION OF THE RELATED ART

Studies to apply quantum dots defined as semiconductor nanoparticles which have a size of 10 nm or less and composed of from 10 to 100 atoms as phosphors of light emitting diodes have been recently actively conducted. Quantum dots have features that the band gap ($E_g$) increases in inverse proportion to the size (d) of the quantum dots, the band gap is further widened by the quantum confinement effect when the Bohr radius is smaller than the size of the quantum dots, and quantum dots have well-defined electronic energy levels between atoms and molecules and bulk.

The quantum dots having such features exhibit luminescence properties having spreading property that the full-width at half maximum (FWHM) at the time of light emission through optical excitation is several tens meV or less to be significantly small and thus having excellent purity, and excellent photoelectric material properties having a color rendering index (CRI) of 90% or more, color gamut, and a luminous efficiency of 70% or more, and thus studies to apply quantum dots to light emitting diodes, light absorbing diodes, electron transporting layers, bioimaging, photoelectrochemical cell electrodes, solar cells, and the like are underway.

Quantum dots are classified into binary and ternary compounds depending on the constituents and classified in detail into II-VI group: CdTe, CdSe, and CdS, II-V group: InP and InAs, I-III-VI group: $CuInS_2$, $AgInS_2$, and IV-VI group: PbSe and PbS. Among them, CdSe, PbS and the like, which are quantum dots composed of S, Se chalcogenide compounds with group II and group IV, Cd, Pb and the like are known to be the most efficient until now. For example, the infrared-visible light region at from 0.8 eV to 2.6 eV is implemented through size control of core-shell structure quantum dots such as PbS/CdSe to CdSe/ZnS.

However, CdSe material is classified as harmful materials by the European Union (EU) and the like and thus is not suitable to be used in the manufacture of photoelectric devices. In addition, the use of toxic materials such as Pb is also strictly regulated. Recently, InP and $CuInS_2$ which are In-based compounds have been actively studied as a new quantum dot material to overcome this problem. However, In also has problems of significantly high cost and monopolization of market prices due to limited reserves and exclusive supply from China and the like, and the In-based compounds have a disadvantage that the quantum efficiency thereof is relatively low as compared with the Cd- and Pb-based compounds.

Recently, Te-doped ZnTeSe blue light-emitting quantum dots have been reported, but although the toxicity is low, the use of Te also has a fundamental problem to be solved. Recently, there is a perovskite (e.g., $MAPbX_3$) material that has been in the spotlight due to very small full width at half maximum of emission curve and very high quantum yield (up to 92%), but the fundamental issues such as stability against air and moisture and Pb toxicity must be addressed.

On the other hand, among II-VI semiconductor materials with a direct transition type wide band gap ($E_g$>3.3 eV, room temperature), ZnO not only exists in a very large amount in nature, but is also an eco-friendly material, so it is attracting attention as a non-Cd, non-In based material. However, except when the ZnO oxide semiconductor is prepared as a single crystal or stacked thin film with excellent crystallinity, when it is made of quantum dots, which is a nanostructure, it is likely to contain intrinsic defects such as oxygen vacancy ($V_O$) due to lack of oxygen or interstitial Zn atoms ($Zn_i$). The energy level of these intrinsic defects exists within a bandgap defined by the difference between a conduction band (CB) and a valence band (VB). When these intrinsic defects exist, electrons present in a valence band gain energy by external photo or electrical excitation and transit to a conduction band, which is a high energy level. In order to be return to the stable original state, the electrons lose energy and directly transit to the valence band (see FIG. 1A), and rather than generating near-ultraviolet rays at a wavelength of about 375 nm (=3.3 eV) corresponding to the bandgap, as indicated by the dotted line in FIG. 1B, the excited electrons move to an energy level near the bottom of the conduction band. In this way, light emission mainly occurs as a transition to a defect energy level of lower energy in the bandgap or to the valence band, and most of the light emission has a lower energy than the bandgap energy, that is, a wavelength in the visible ray region of a long wavelength. Depending on the type and concentration of intrinsic defects, visible light such as green light emission, yellow light emission, blue light emission, or the like is observed, and its intensity is determined.

As such, ZnO quantum dots have a characteristic that it is difficult to emit light of a specific single color due to intrinsic defects. Regarding this problem of ZnO quantum dots, in Korean Patent Registration No. 2072438, the inventors have proposed a core-shell structure in which graphene oxide is bonded to ZnO, and realized a quantum dot capable of ultimately emitting blue light suppressing yellow light emission by eliminating the oxygen vacancies in ZnO through the bonding of ZnO with graphene oxide.

Through the technology disclosed in Korean Patent Registration No. 2072438, blue light emission of ZnO quantum dots can be realized. However, as only the oxygen vacancy defects of ZnO are eliminated, a phenomenon in which colors other than blue color are emitted due to electronic transition to the energy level of other defects still occurs.

SUMMARY OF THE INVENTION

The disclosure has been devised to solve the above problems, and has an object to provide to a light emitting diode using zinc oxide-aminopyrene core-shell quantum dots capable of improving the purity of blue light emission and securing long lifetime through the characteristic that emission transition of electrons proceeds in aminopyrene by applying the zinc oxide-aminopyrene quantum dots forming a core-shell structure with zinc oxide (ZnO) and 1-aminopyrene to the light emitting diode.

In order to achieve the above object, a light emitting diode using a zinc oxide-aminopyrene core-shell quantum dot according to the disclosure comprises a blue light-emitting layer of a ZnO@1-aminopyrene quantum dot, wherein the ZnO@1-aminopyrene quantum dot has a core-shell structure in which a ZnO quantum dot form a core and a 1-aminopyrene forms a shell.

The ZnO@ 1-aminopyrene quantum dot has a quasi-Type II structure in the correlation of energy levels, and an unoccupied molecular orbital (LUMO) of the 1-aminopyrene has a higher energy level than a conduction band (CB) of the ZnO, and an occupied molecular orbital (HOMO) of the 1-aminopyrene has a higher energy level than a valence band (VB) of the ZnO.

The 1-Aminopyrene has an energy band gap ($E_g$) between the unoccupied molecular orbital (LUMO) and the occupied molecular orbital (HOMO) of 2.5 eV or more.

When the ZnO@1-aminopyrene quantum dot is irradiated with light, photoexcited electron moves from the ZnO quantum dot to the 1-aminopyrene, and electronic transition occurs within the 1-aminopyrene to generate blue light emission.

A hole injection layer (HIL), a hole transfer layer (HTL), a blue light-emitting layer (EML), and an electron transport layer (ETL) are sequentially stacked on a first electrode of a glass substrate, and a second electrode is formed on the electron transport layer (ETL), the blue light-emitting layer (EML) is composed of the ZnO@1-aminopyrene quantum dot of the core-shell structure.

The light emitting diode using the zinc oxide-aminopyrene core-shell quantum dots has $T_{50}$, which is time required for an initial luminance value of 100 cd/m² to decrease by 50%, of 10,000 hours or more.

The light emitting diode using zinc oxide-aminopyrene core-shell quantum dots according to the disclosure has the following effects.

Through the ZnO@1-Aminopyrene quantum dots of the quasi-Type II structure, the purity of blue light emission can be improved and the lifetime of the light emitting diode can be increased.

BRIEF DESCRIPTION OF THE DRAWINGS

FIG. 1A illustrates near-ultraviolet emission of ideal defect-free ZnO, and FIG. 1B illustrates visible light emission of general ZnO containing defects.

DETAILED DESCRIPTION OF THE INVENTION

Figure 1A:
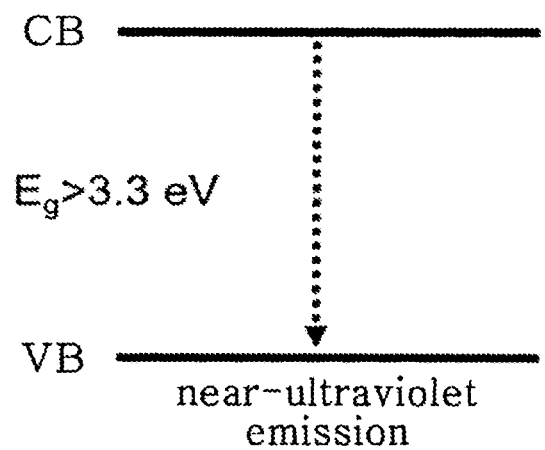
FIGS. 1A and 1B are reference diagrams illustrating light emission property by electronic transition of ZnO quantum dots.
Figure 1B:
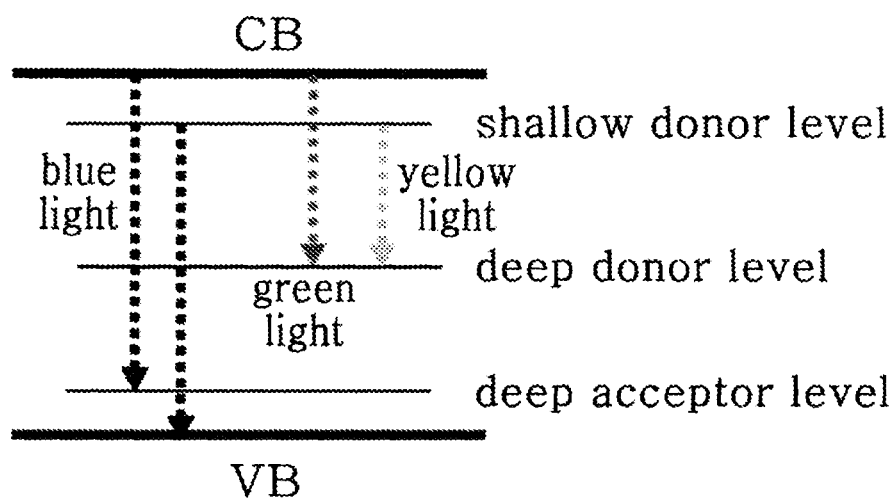

The disclosure proposes a technology related to a light emitting diode capable of securing long lifetime as well as improving blue light-emitting property.

The disclosure improves the blue light-emitting property of a light emitting diode and enables long-term use of the light emitting diode by applying zinc oxide-aminopyrene core-shell quantum dots (ZnO@1-Aminopyrene core-shell quantum dots) as a blue light emitting layer of the light emitting diode.

One of the factors directly related to the blue light-emitting property of quantum dots is the purity of blue light emission. Quantum dots that emit blue light emit blue light due to the emission transition of electrons, that is, electronic transition. When impurities exist in the quantum dots, emission of other colors in addition to blue light is also generated, and thus, the purity of blue light emission is lowered.

Zinc oxide-aminopyrene core-shell quantum dots according to the disclosure are quantum dots in which zinc oxide (ZnO) and aminopyrene (1-aminopyrene) form a core-shell structure, which has characteristic that electronic transition is generated in 1-aminopyrene corresponding to a shell, thereby improving the purity of blue light emission.

The factor that can improve the purity of blue light emission through zinc oxide-aminopyrene core-shell quantum dots is due to the blue light-emitting property of 1-aminopyrene and the quasi-Type II structure of zinc oxide-aminopyrene core-shell quantum dots.

1-aminopyrene is a material in which an amino group (—NH$_2$) is bonded to pyrene, and the amino group (—NH$_2$) mediates the bond between 1-aminopyrene and zinc oxide (ZnO) corresponding to the core.

The pyrene is a material belonging to polycyclic aromatic hydrocarbons, and has characteristics of emitting various colors according to the value of energy band gap ($E_g$), and in the case of the energy band gap ($E_g$) value of 2.5 eV or more, blue light-emitting property is exhibited. Therefore, the pyrene having an energy band gap ($E_g$) value of 2.5 eV or more is applied as the pyrene of the disclosure. Here, the energy band gap ($E_g$) means an energy difference between the lowest unoccupied molecular orbital (LUMO) and the highest occupied molecular orbital (HOMO). For reference, the polycyclic aromatic hydrocarbons are classified into polycyclic aromatic hydrocarbons with linearly connected benzene rings and polycyclic aromatic hydrocarbons with nonlinearly connected benzene rings. The pyrene to which the disclosure is applied belongs to the polycyclic aromatic hydrocarbons with nonlinearly connected benzene rings, and the number (n) of benzene rings is 4. The inventors have proposed in a paper (Blue light emissive type II ZnO@5-Amino-2-Naphthalene Sulfonic Acid Core-Shell Quantum Dots, *Advanced Photonics Research* (2022)) the technology that applies naphthalene (n=2), which belongs to the polycyclic aromatic hydrocarbons with linearly connected benzene rings, as the shell of quantum dots.

The structure of quantum dots is largely divided into two types according to the shape of the energy level of the core and shell. One is a Type I structure, and the other is a Type II or quasi-Type II structure.

The Type I structure is a structure in which the energy levels (CB, VB) of the core are located within the energy levels (LUMO, HOMO) of the shell. On the other hand, the Type II structure and the quasi-Type II structure are structures in which the energy levels of the core and the energy levels of the shell are staggered.

More specifically, in the Type I structure, the conduction band (CB) of the core has a lower energy level than that of the LUMO of the shell, and the valence band (VB) of the core has a higher energy level than that of the HOMO of the shell. On the other hand, in the case of the Type II structure, the conduction band (CB) of the core has a higher energy level than that of the LUMO of the shell, and the valence band (VB) of the core also has a higher energy level than that of the HOMO of the shell. In addition, in the case of the quasi-Type II structure, the conduction band (CB) of the core has a lower energy level than that of the LUMO of the shell, and the valence band (VB) of the core also has a lower energy level than that of the HOMO of the shell.

In the case of the Type I structure, since the energy band gap of the shell is larger than that of the core, electrons and holes have the characteristic of being confined to the core, and in the quasi-Type II structure (or Type II structure), electrons move to the shell due to the staggered energy levels.

Figure 2A:
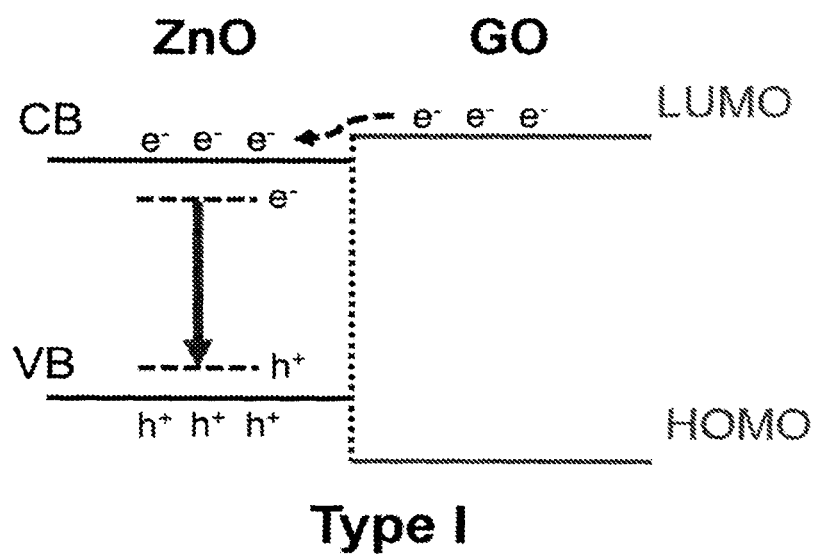
FIG. 2A is a reference diagram illustrating electronic transition in a Type I structure.

As an example of the Type I quantum dot structure, Korean Patent Registration No. 2072438, which was registered by the present applicant, may be cited. In Korean Patent Registration No. 2072438, the conduction band (CB) of ZnO has a lower energy level than that of the LUMO of graphene oxide (GO), and the valence band (VB) of ZnO has a higher energy level than that of the HOMO of graphene oxide (GO) (see FIG. 2A). As the ZnO-GO quantum dots disclosed in Korean Patent No. 2072438 form the Type I structure, electronic transition occurs within ZnO, which is the core, and thus blue light emission is generated. In contrast, electronic transition does not occur in graphene oxide (GO), which is the shell.

Figure 2B:
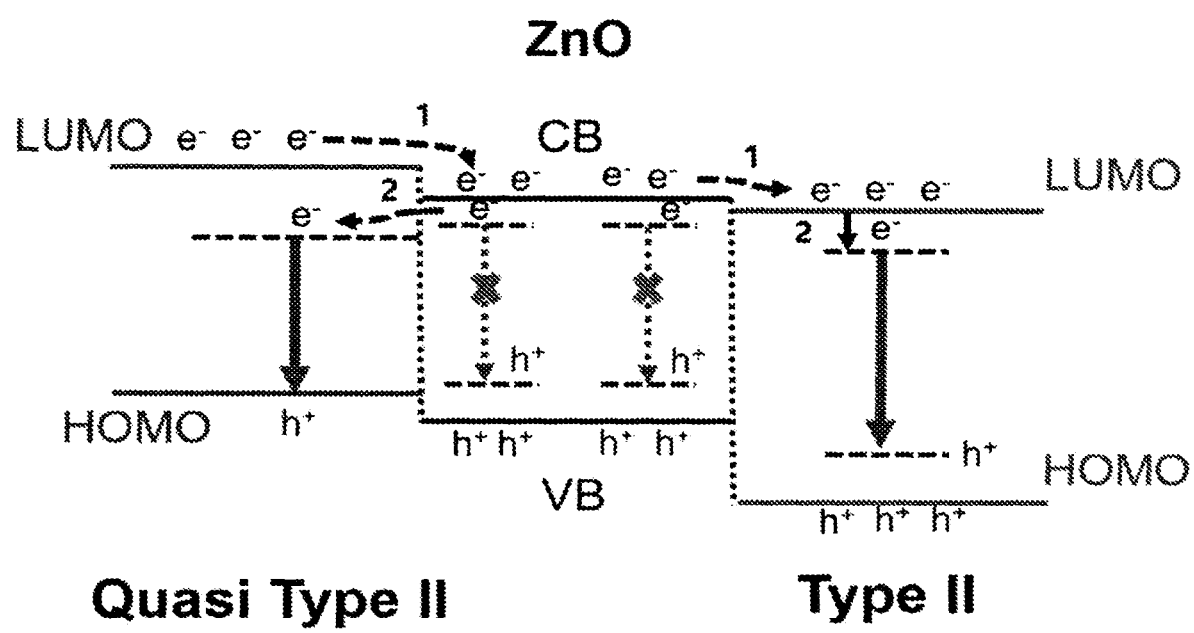
FIG. 2B is a reference diagram illustrating electronic transition in a Type II structure and a quasi-Type II structure.
Figure 3:
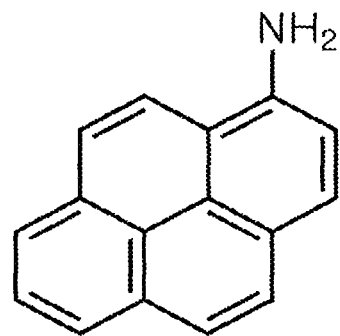
FIG. 3 illustrates a chemical structure of 1-aminopyrene.

Unlike the ZnO-GO quantum dots disclosed in Korean Patent Registration No. 2072438, the zinc oxide-aminopyrene core-shell quantum dots according to the disclosure have the quasi-Type II structure, and therefore, electronic transition does not occur in the core of ZnO but in the shell of 1-aminopyrene (see FIG. 2B).

As described above, 1-aminopyrene to which the disclosure is applied is '1-aminopyrene having the energy band gap ($E_g$) of 2.5 eV or more' and blue light-emitting property, and since the quantum dots form the quasi-Type II structure, electronic transition occurs in the shell (1-aminopyrene), not the core, and the 1-aminopyrene has blue light-emitting property due to electronic transition. Therefore, the zinc oxide-aminopyrene core-shell quantum dots according to the disclosure have blue light-emitting property due to the quasi-Type II structure and the characteristics of the '1-aminopyrene having the energy band gap ($E_g$) of 2.5 eV or more'.

The zinc oxide-aminopyrene core-shell quantum dots according to the disclosure have the quasi-Type II structure in which electronic transition occurs in the 1-aminopyrene to generate blue light emission, so that the purity of blue light emission can be improved compared to the method of generating blue light emission in the ZnO of the ZnO-GO quantum dots of Type I structure. In the case of ZnO-GO quantum dots, even if blue color-based light emission is induced by suppressing yellow color light emission in the ZnO, light emission of colors other than blue color cannot be completely prevented, whereas the zinc oxide-aminopyrene core shell quantum dots according to the disclosure applies the 1-aminopyrene having blue light-emitting property so that the purity of blue light emission is naturally improved.

On the other hand, the 1-aminopyrene to which the disclosure is applied must have LUMO and HOMO properties to satisfy the quasi-Type II structure in addition to the condition of the '1-aminopyrene with the energy band gap ($E_g$) of 2.5 eV or more' as described above. That is, in order to satisfy the quasi-Type II structure, the energy levels of LUMO and HOMO of the 1-aminopyrene must be higher than the conduction band (CB) and valence band (VB) of ZnO, respectively. Here, it is known that the energy band gap of ZnO is about 3.4 eV, the conduction band (CB) of ZnO is about −3.35 eV based on the vacuum energy level ($E_{vac}$=0 eV), and the valence band (VB) of ZnO is about −6.75 eV.

Experimental Example 1: Preparation of ZnO-70 Quantum Dots

ZnO quantum dots with a high concentration of interstitial $Zn_i$ defects were prepared using a solution-precipitation method. Solution A, a reducing agent, was prepared by dissolving 5 μM of tetramethylammonium hydroxide (TMAH) in 10 ml of pure ethanol at room temperature, and solution B, precursor, was prepared by completely dissolving 3 μM of zinc acetate (($Zn(CH_2COOH)_2$) in 30 ml of DMSO at room temperature for about 30 minutes. Solution B was titrated into solution A at a rate of 0.666 ml/min, and then stirred at a temperature of 70° C. for 1 hour to prepare ZnO quantum dots. The prepared ZnO quantum dots were washed with an acetone solution and collected through a centrifuge rotating at 12,000 rpm for 10 minutes, and when used, it was redispersed by ultrasonic waves in 15 ml of an ethanol solution.

Experimental Example 2: Preparation of ZnO@1-Aminopyrene Core-Shell Quantum Dots A 1-aminopyrene solution in which 500 mg of 1-aminopyrene was uniformly dispersed in 40 ml of DMF was prepared, and a ZnO quantum dot solution was prepared by dispersing 1.2 g of the ZnO quantum dots prepared in Experimental Example 1 in 300 ml of DMF. Then, the 1-aminopyrene solution was added to the ZnO quantum dot solution while stirring slowly. Then, the solution in which the 1-aminopyrene solution was mixed with the ZnO quantum dot solution was heated up to 120° C. and maintained for 5 hours to prepare quantum dots in which 1-aminopyrene was bonded to ZnO, that is, ZnO@1-aminopyrene core-shell quantum dots. Subsequently, after purification with toluene, acetone, etc., ZnO@1-aminopyrene core-shell quantum dots were extracted in a centrifuge and dried at 70° C.

Experimental Example 3: Analysis of Physical Properties of ZnO@1-Aminopyrene Core-Shell Quantum Dots X-ray diffraction analysis, FT-IR analysis, SEM analysis, and TEM analysis were performed for the ZnO quantum dots, 1-aminopyrene, and the ZnO@1-aminopyrene core-shell quantum dots prepared in Experimental Example 2.

Figure 4A:
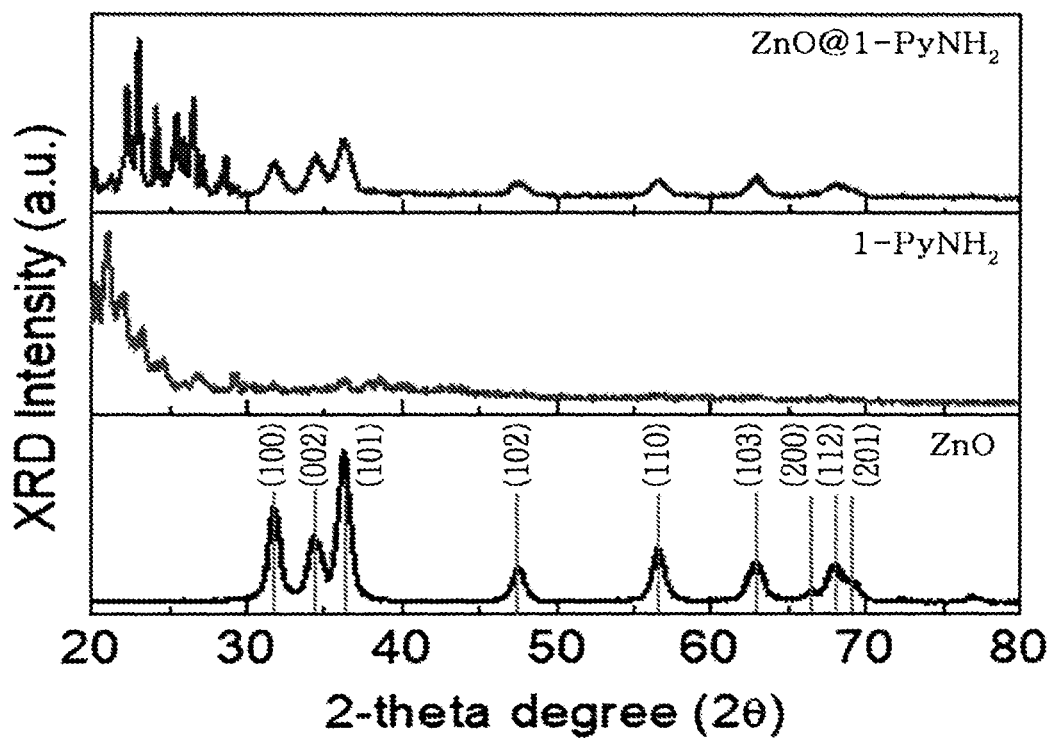
FIG. 4A illustrates a X-ray diffraction analysis result for ZnO quantum dots and 1-aminopyrene and ZnO@1-aminopyrene core-shell quantum dots prepared in Experimental Example 2.

As a result of X-ray diffraction analysis (see FIG. 4A), it was confirmed that very similar to the case of bulk ZnO, diffraction surfaces of ZnO (100), (002), (101), (102), (110), (103), and (112) were all well observed in ZnO quantum dots. In the case of the 1-aminopyrene molecule, many sharp diffraction patterns were observed, which is attributed to the microcrystalline structure of 1-aminopyrene. The X-ray diffraction patterns of ZnO@1-aminopyrene core-shell quantum dots showed that the main diffraction patterns of ZnO were reduced by the 1-aminopyrene bonded to the outer shell of the ZnO nucleus as a shell, but the diffraction patterns of ZnO (100), (002), and (101) were observed as such.

Figure 4B:
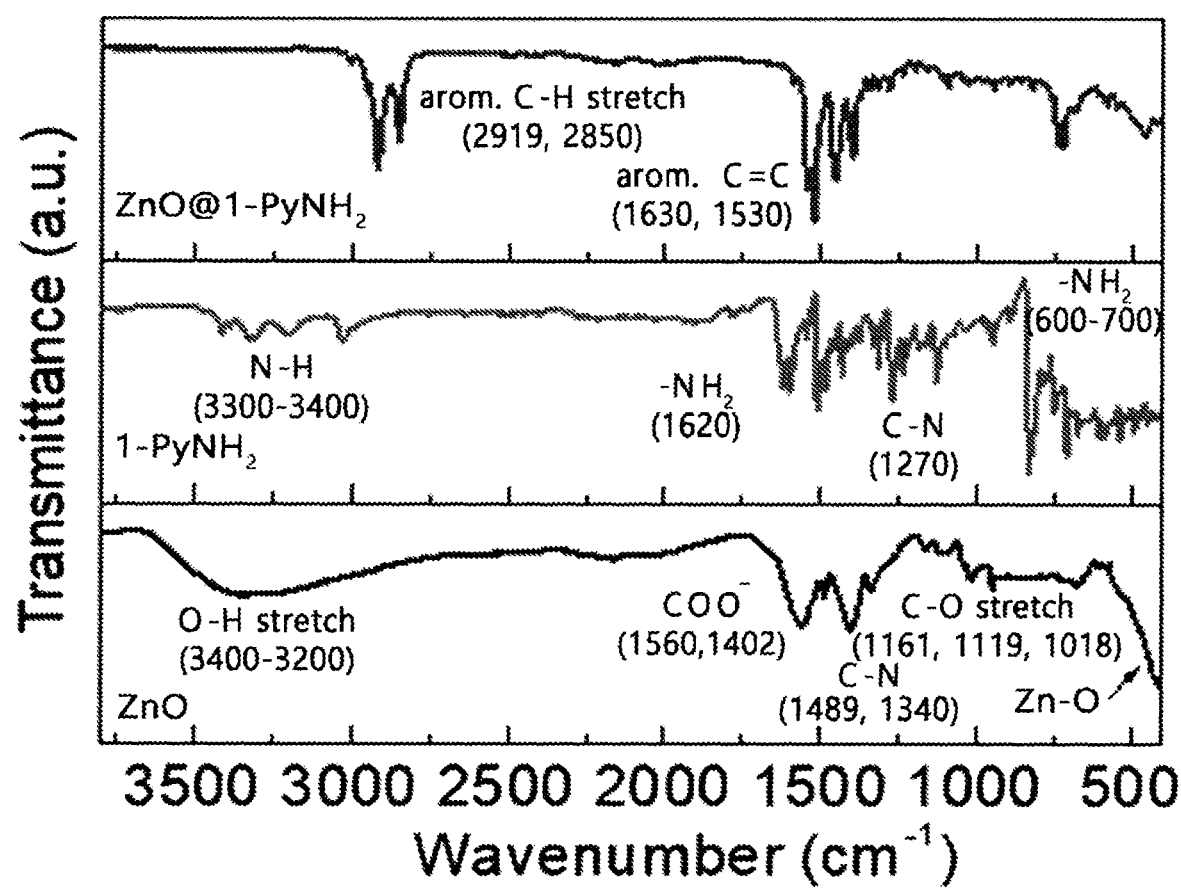
FIG. 4B illustrates a FT-IR analysis result for ZnO quantum dots and 1-aminopyrene and ZnO@1-aminopyrene core-shell quantum dots prepared in Experimental Example 2.

As a result of FT-IR analysis (see FIG. 4B), it was confirmed that-OH (hydroxyl group) (3200 to 3400 $cm^{-1}$), —COO (carboxyl group) (1400, 1560 $cm^{-1}$), and C—N bonds (1330, 1490 $cm^{-1}$) by the TMAH reducing agent remained on the surface of ZnO quantum dots prepared by the solution-precipitation method according to Experimental Example 1. On the surface of ZnO@1-aminopyrene core-shell quantum dots formed through bonding with 1-aminopyrene after washing in DMF, C—H bonds (2919, 2850 $cm^{-1}$), C—N bonds (1270 $cm^{-1}$), C═C bonds (1630, 1530 $cm^{-1}$), and bonds related to N—H (3400-3300, 1620, 700-600 $cm^{-1}$) related to 1-aminopyrene were observed.

Figure 4C:
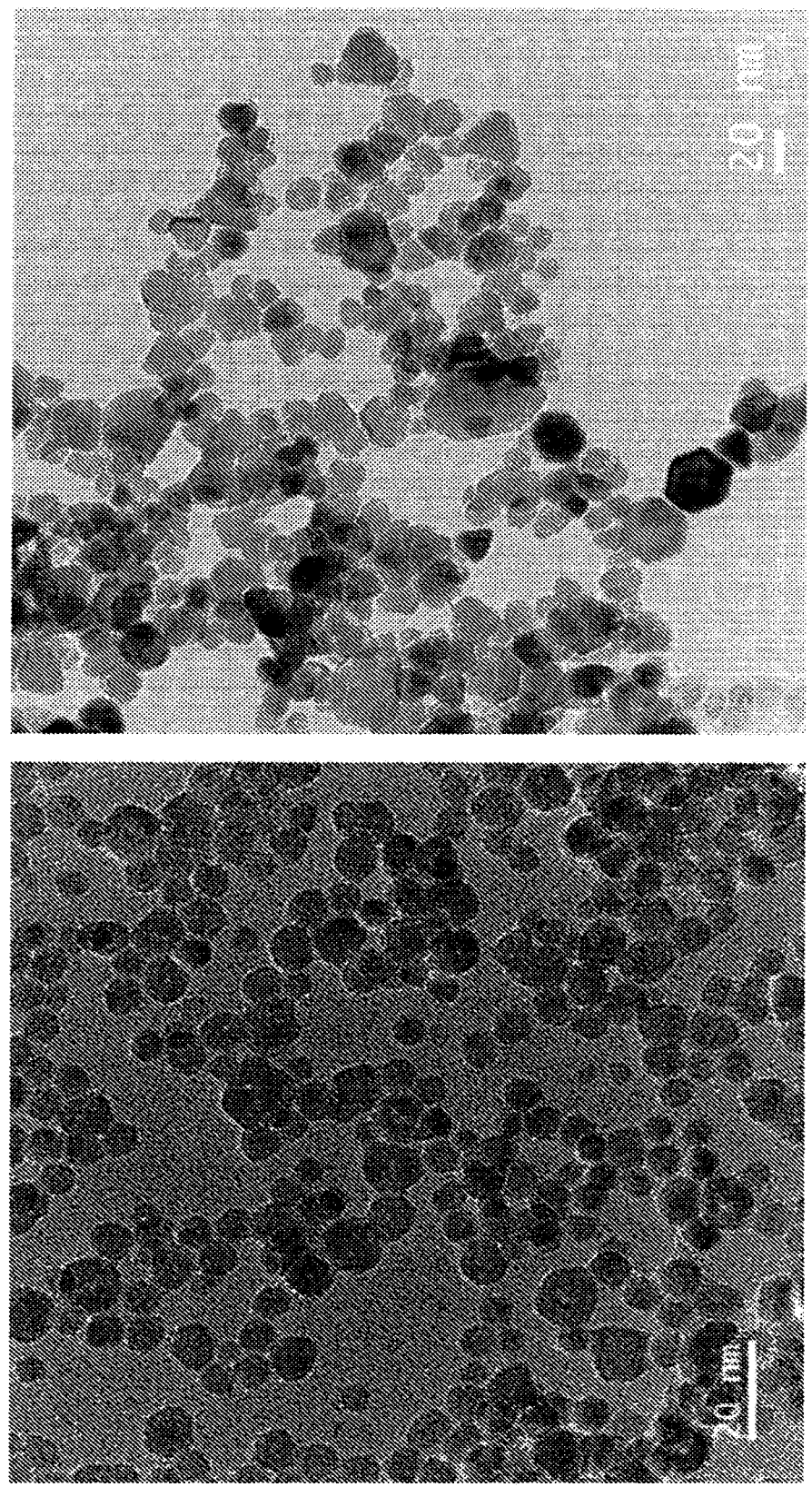
FIG. 4C is a SEM photograph of ZnO quantum dots (left) and ZnO@1-aminopyrene core-shell quantum dots (right), respectively.
Figure 4D:
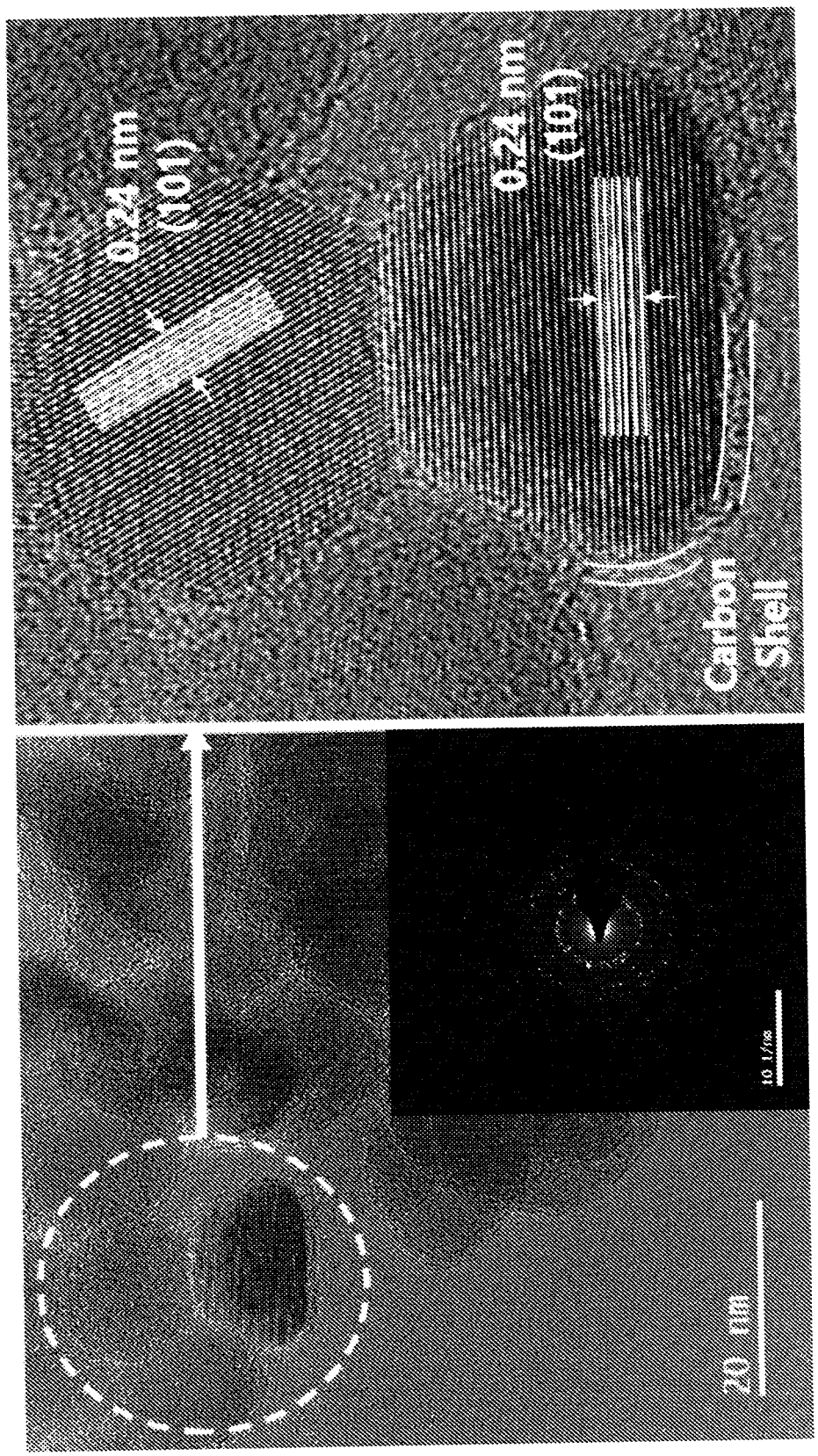
FIG. 4D is a TEM photograph of ZnO@1-aminopyrene core-shell quantum dots.

In addition, through SEM analysis, the average sizes of ZnO quantum dots (see the left photo in FIG. 4C) and ZnO@1-aminopyrene core-shell quantum dots (see the right photo in FIG. 4C) were measured to be about 8.45 nm and 12.42 nm. In addition, it was confirmed by TEM analysis that ZnO, the core in the ZnO@1-aminopyrene core-shell quantum dots, was polycrystalline (see the left photograph in FIG. 4D) and the ZnO (101) crystal plane interval of the ZnO wurtzite structure was 0.24 nm (see the right photograph in FIG. 4D).

Experimental Example 4: Energy Level Analysis of ZnO Quantum Dots and Aminopyrene The absorption spectra, emission spectra, photoluminescence excitation (PLE) spectra, and ultraviolet photoemission spectroscopy (UPS) of ZnO quantum dots, 1-aminopyrene, and ZnO@1-aminopyrene core-shell quantum dots were used to analyze the energy levels of the ZnO quantum dots and 1-aminopyrene, respectively.

Figure 5A:
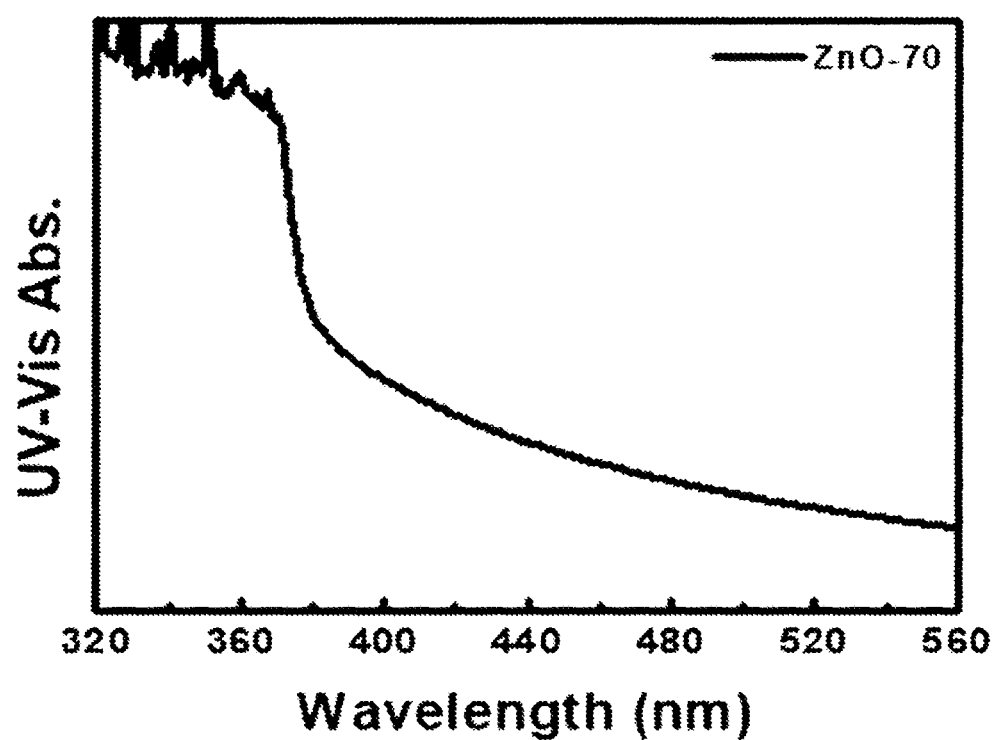
FIG. 5A illustrates an ultraviolet-visible light absorption spectrum of ZnO-70 quantum dots of Experimental Example 1.
Figure 5B:
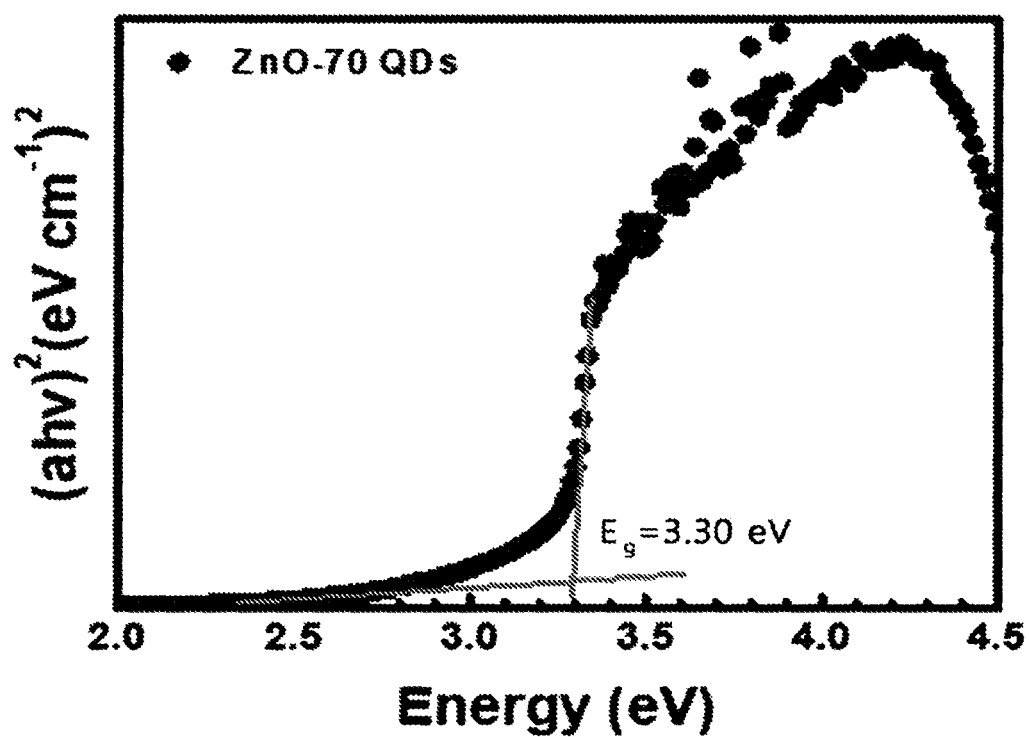
FIG. 5B illustrates a Tauc plot obtained from FIG. 5A.

FIG. 5A illustrates an ultraviolet-visible light absorption spectrum of the ZnO-70 quantum dots prepared by Experimental Example 1, and FIG. 5B illustrates a Tauc Plot obtained from FIG. 5A, that is, a graph showing $(\alpha h\nu)^2$=A $(h\nu-E_g)$, in which by extrapolation, the intersection with the x-axis corresponded to the band gap ($E_g$), and $E_g$ was measured to be 3.30 eV.

Figure 5C:
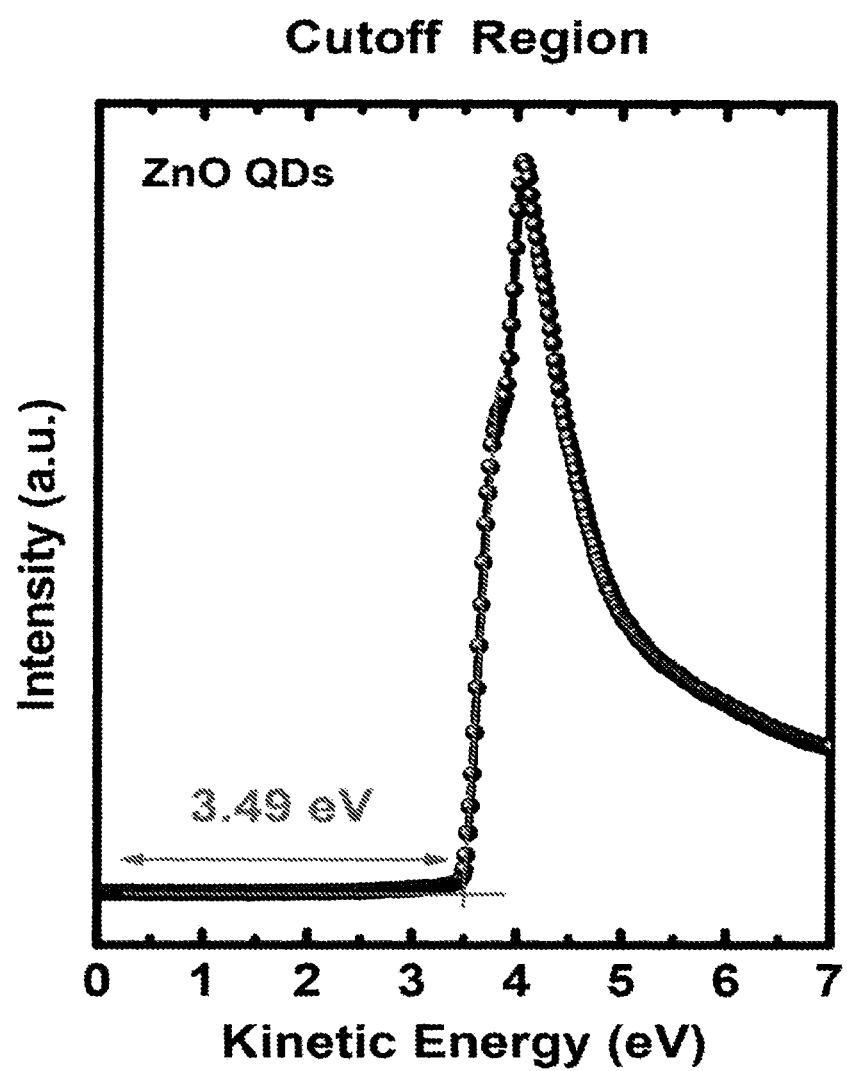
FIGS. 5C and 5D illustrate UPS spectra of ZnO-70 quantum dots.
Figure 5D:
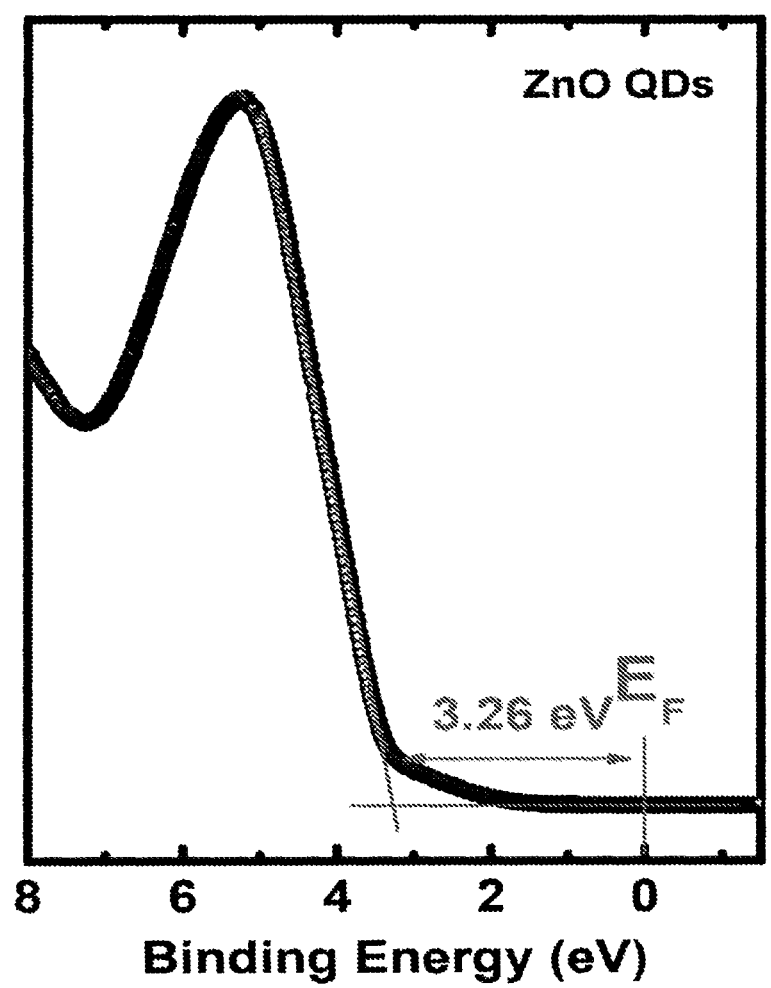

From the Fermi energy level (−3.49 eV) of ZnO-70 quantum dots (see FIG. 5C) and the energy difference (3.26 eV) with the valence band (VB) (see FIG. 5D), the energy of the valence band (VB) was defined as (−3.49 eV)+(−3.26 eV)=−6.75 eV from the vacuum energy level ($E_{Vac}$), and the energy level of the conduction band (CB) was defined as (−6.75 eV)+(3.30 eV)=−3.45 eV from the band gap $E_g$=3.3 eV obtained from the Tauc plot in FIG. 5B.

Figure 6A:
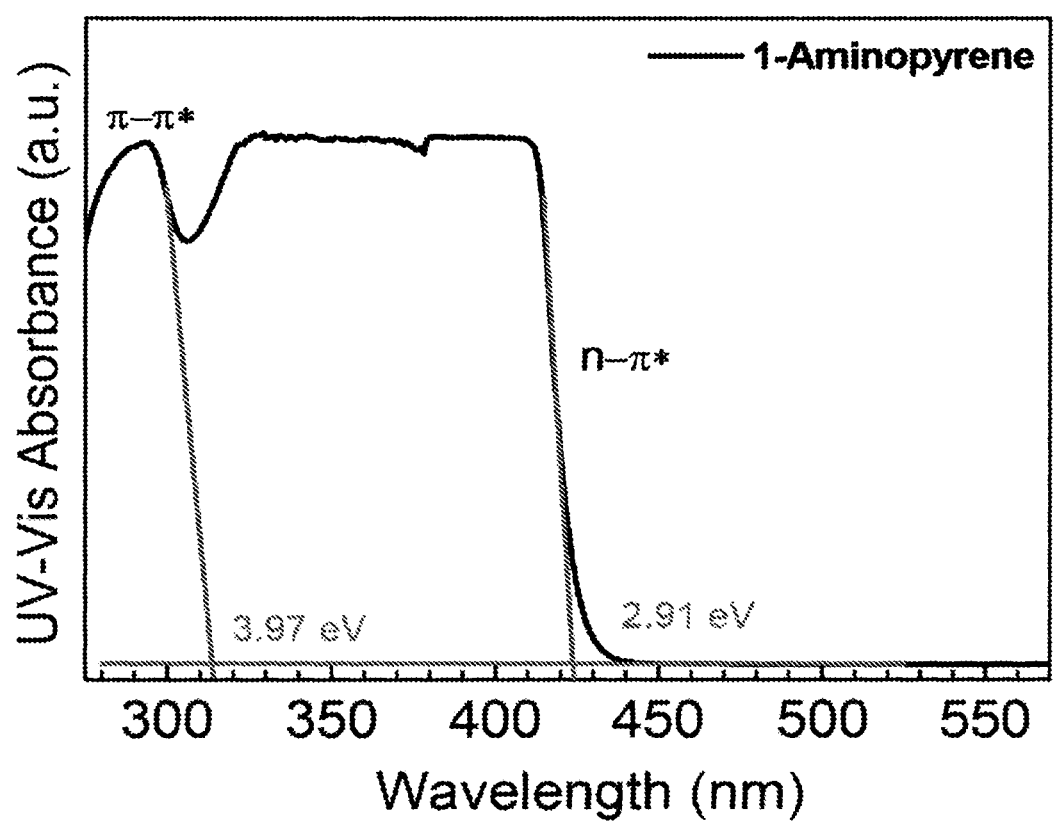
FIG. 6A illustrates an ultraviolet-visible absorption spectrum of 1-aminopyrene.

FIG. 6A illustrates an ultraviolet-visible absorption spectrum of 1-aminopyrene, and by extrapolation, the intersections with the x-axis were measured at 312 nm (=3.97 eV) and 425 nm (=2.91 eV), respectively. The former, 312 nm is due to the light absorption between the HOMO (C═C, π)

and LUMO (C=C, π*) of the pyrene, and the latter, 425 nm is due to the light absorption (n-π*) between LUMO (C=C, π*) and n(π), bonding orbitals (π) of the non-bonding state (n) formed directly above the HOMO induced by the $NH_2$ functional group included in the 1-aminopyrene.

Figure 6B:
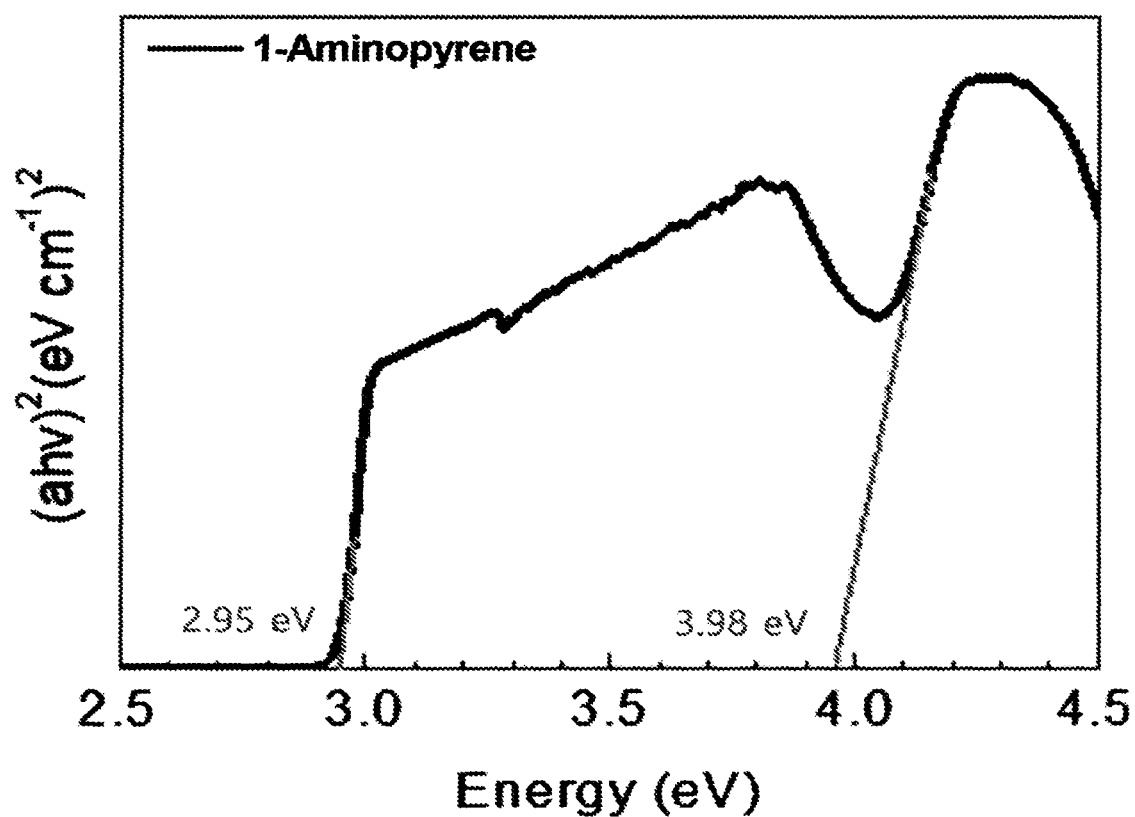
FIG. 6B illustrates a Tauc plot obtained from FIG. 6A.

FIG. 6B illustrates a Tauc Plot obtained from FIG. 6A, that is, a graph showing the $(\alpha h\nu)^2=A(h\nu-E_g)$ relationship, where the intersection with the x-axis by extrapolation corresponds to the band gap ($E_g$) and $E_g$ was measured to 2.95 eV. It was almost similar to 2.91 eV calculated through FIG. 6A.

Figure 6C:
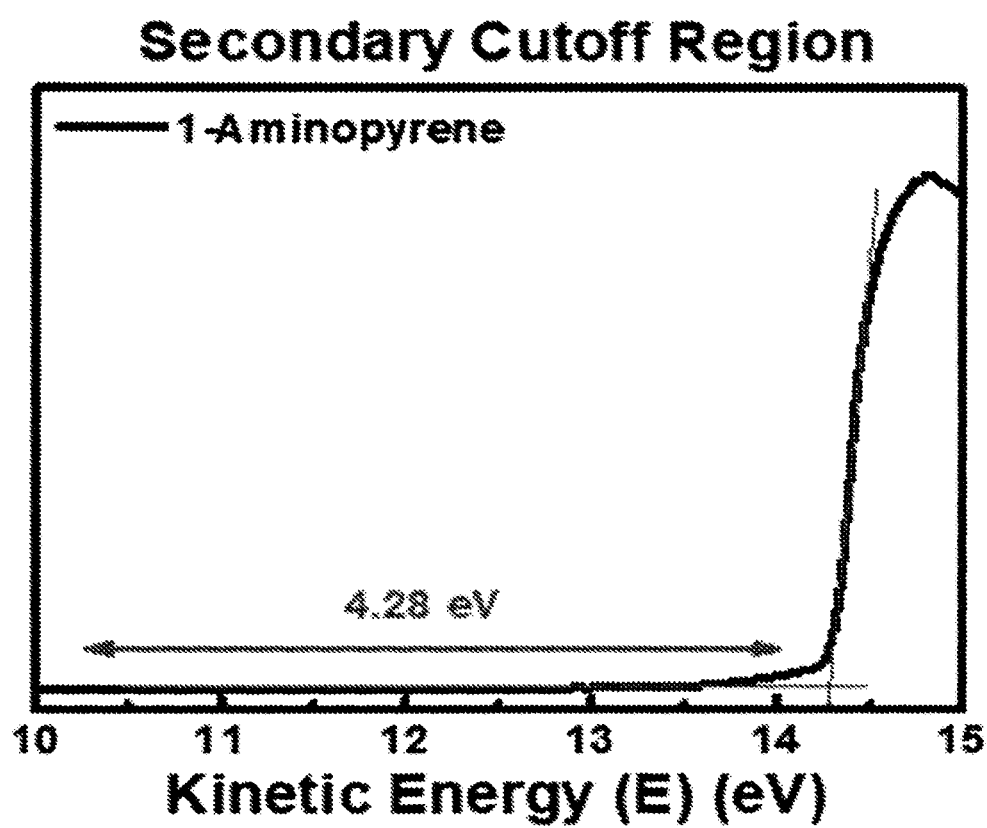
FIGS. 6C and 6D illustrate UPS spectra of 1-aminopyrene.
Figure 6D:
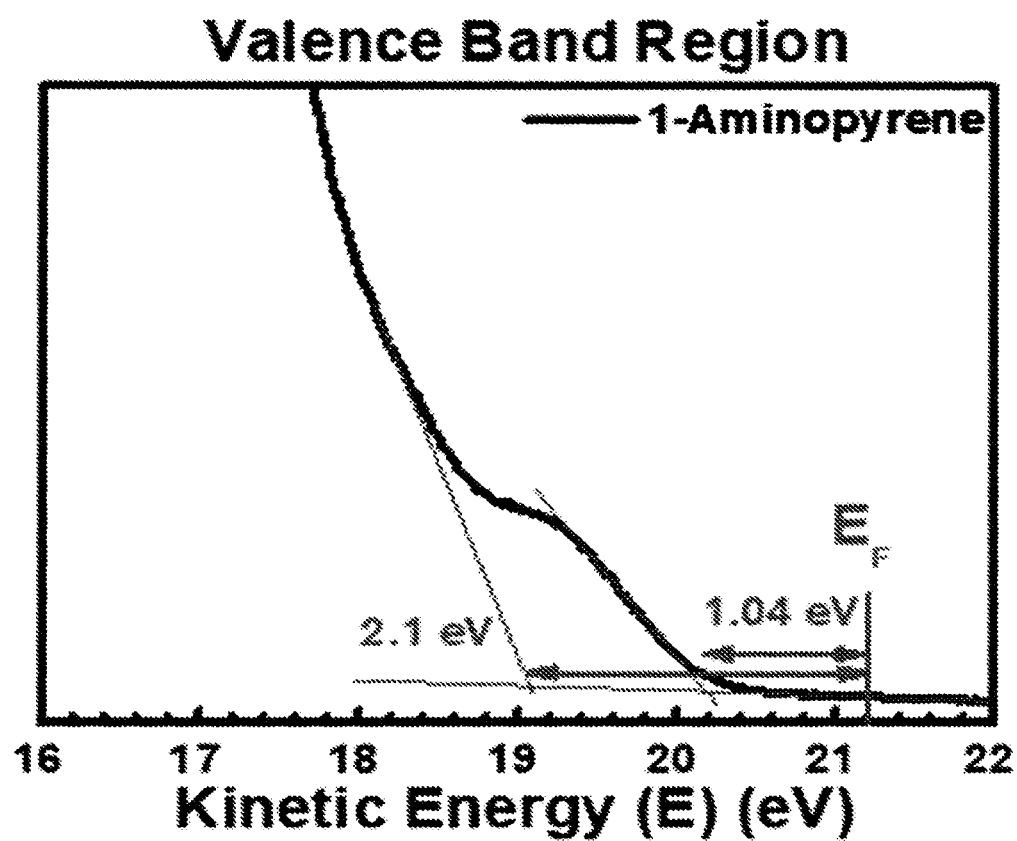
Figure 7:
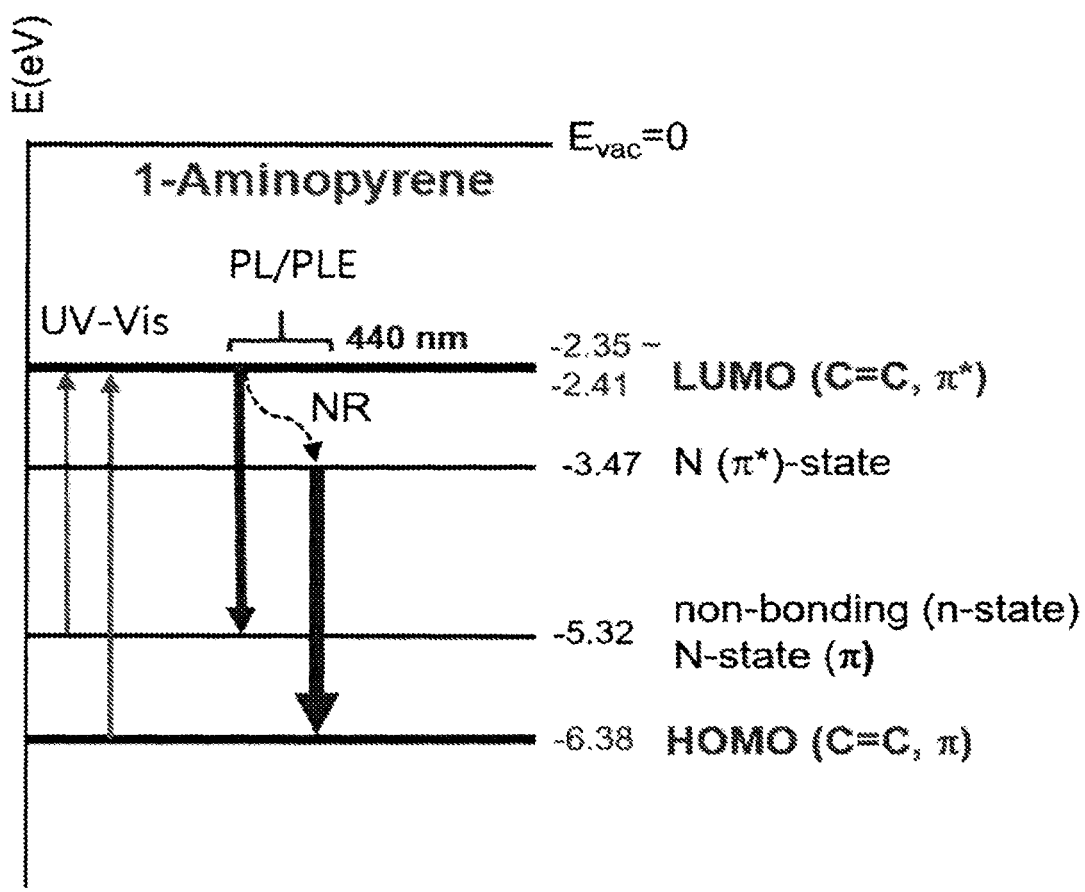
FIG. 7 is a schematic reference diagram of an electron energy level of 1-aminopyrene.

FIGS. 6C and 6D illustrate the results of ultraviolet photoelectron spectroscopy (UPS) of the 1-aminopyrene. Here, from the Fermi energy level (−4.28 eV) obtained by the secondary electron cut-off method and the energy difference of 1.04 eV and 2.1 eV with HOMO (see FIG. 6D), the energy level of HOMO is defined as two energy levels, the vacuum energy level ($E_{Vac}$=0 eV) and (−4.28 eV)+(−1.04 eV)=−5.32 eV, (−4.28 eV)+(−2.1 eV)=−6.38 eV. From 312 nm (=3.97 eV), which is the light absorption between HOMO and LUMO, the LUMO energy level is defined as (−6.38 eV)+(3.97 eV)=−2.41 eV. The schematic diagram of the electron energy levels of 1-aminopyrene in FIGS. 6C and 6D is represented as illustrated in FIG. 7.

Figure 8A:
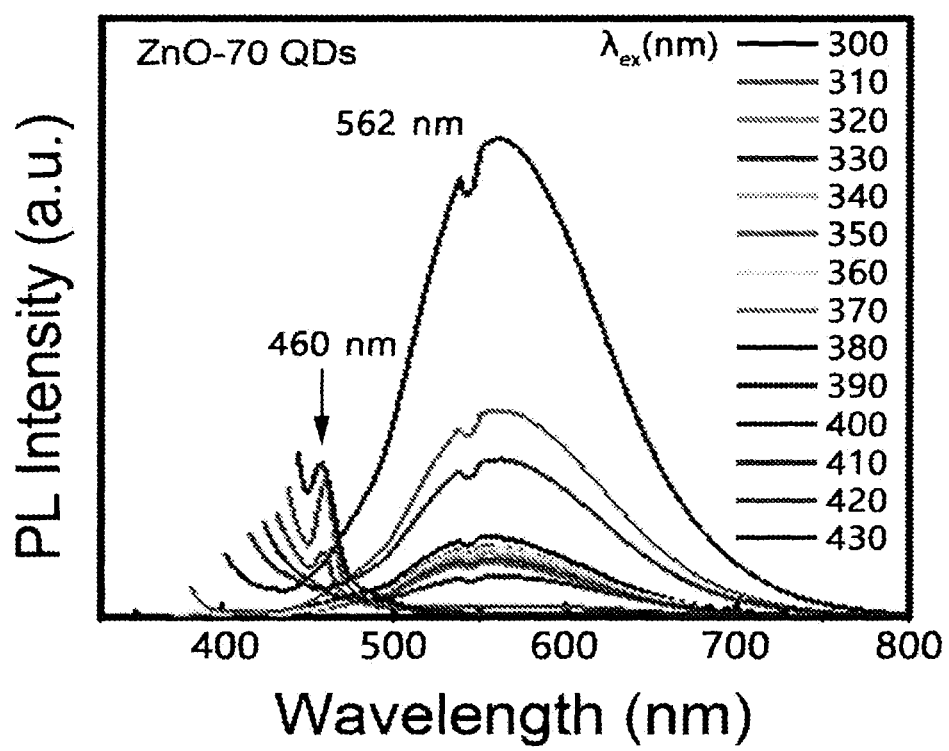
FIG. 8A illustrates a light emission curve of ZnO-70 quantum dots.

FIG. 8A illustrates a light emission curve according to the excitation wavelength ($\lambda_{ex}$) (300 to 430 nm) of the ZnO-70 quantum dots prepared according to Experimental Example 1. As the excitation wavelength ($\lambda_{ex}$) increases from 300 nm, yellow light emission with a center around 550 nm is observed, and the intensity of the emission curve is maximum at $\lambda_{ex}$=380 nm. When $\lambda_{ex}$ increases with a longer wavelength, the intensity of emission gradually decreases and is observed up to 400 nm, but disappears at longer $\lambda_{ex}$=410 to 430 nm, and instead, only blue light emission centered at 460 nm is newly observed.

Figure 8B:
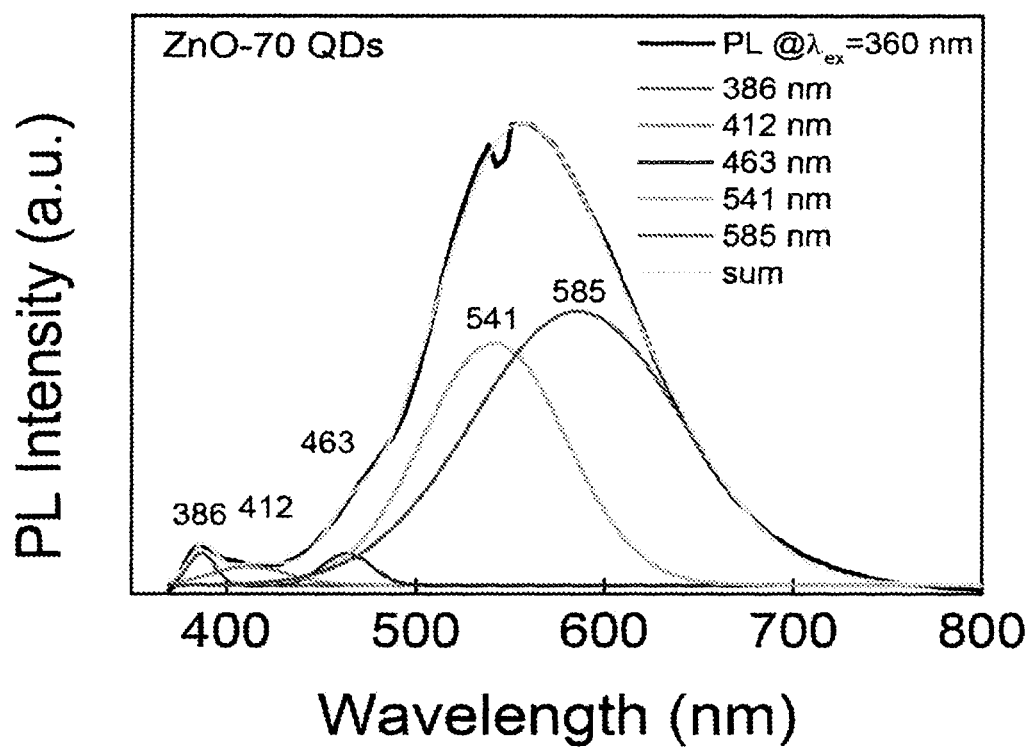
FIG. 8B illustrates a Gaussian fitting result of an emission curve observed at an excitation wavelength of 360 nm.

FIG. 8B illustrates an emission curve of the ZnO-70 quantum dots measured at an excitation wavelength of 360 nm. When the sub-peaks of this emission curve are obtained using Gaussian fitting, the sub-peaks consists of near-ultraviolet light at 386 nm, violet light emission at 412 nm, blue light emission at 463 nm, and yellow light emission near 541 nm and 585 nm. Among them, photoluminescence excitation energy levels involved in generating the visible light emission at 463 nm, 541 nm, and 585 nm were examined. The PLE curves obtained at similar measurement wavelengths of 465 nm, 535 nm, and 580 nm are illustrated in FIG. 9.

Figure 9:
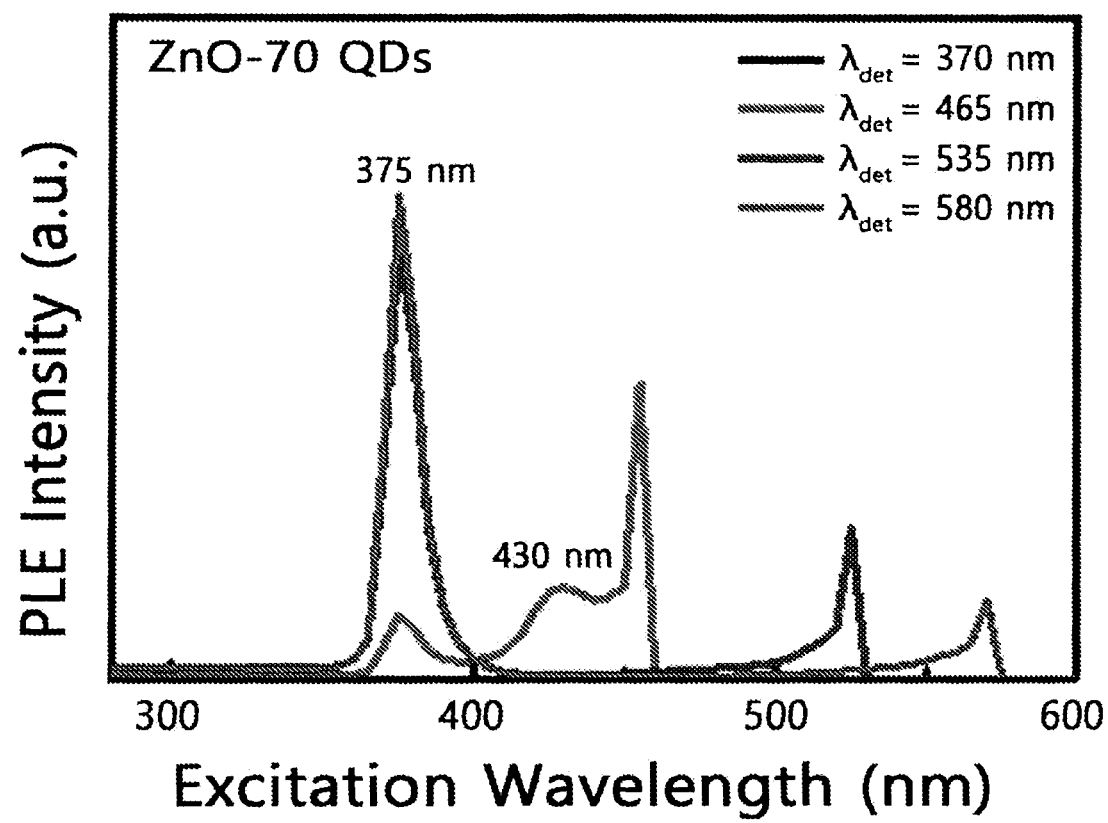
FIG. 9 illustrates a PLE curve of ZnO-70 quantum dots at detection wavelengths of 370, 465, 535, and 580 nm.

As illustrated in FIG. 9, it can be seen that the yellow light emission near 535 nm and 580 nm has a PLE energy level of 375 nm (=3.30 eV), that is, an energy level corresponding to the conduction band (CB). In contrast, it can be seen that the PLE energy level of the blue light emission at 465 nm is due to 430 nm (=2.88 eV) in addition to 375 nm. Therefore, the blue light emission at 460 nm (=2.69 eV) occurs when electrons transition from the energy level of 430 nm (=2.88 eV) to the energy level existing at 0.19 eV above the valence band (VB). The 0.19 eV above the valence band (VB) is well known as the primary ionized Zn vacancy ($V_{Zn}$−) defect energy level. In contrast, at 541 nm (=2.29 eV) and 585 nm (=2.12 eV), only the conduction band (CB), 375 nm (=3.3 eV) is the energy level related to the PLE, and the maximum emission intensity is occurred at the excitation wavelength of 380 nm (=3.26 eV), and the intensity weakens up to the excitation wavelength of 400 nm (=3.1 eV), but yellow light emission is still observed. From the excitation wavelength of 410 nm (=3.0 eV), the yellow light emission disappears, and instead, new 460 nm blue light emission begins to be observed, and the 460 nm blue light emission shows the maximum value at the excitation wavelength of 430 nm. Therefore, it can be seen that the energy levels associated with the yellow light emission of 541 nm (=2.29 eV) and 585 nm (=2.12 eV) are due not only to the conduction band (CB) but also to the low shallow donor energy level that exists between 3.1 eV and 3.26 eV. That is, 3.26 eV-2.29 eV=0.97 eV, 3.1 eV-2.12 eV=0.98 eV, which can be explained as visible light emission due to electronic transition from the valence band (VB) to an energy level that exists above 0.97 to 0.98 eV. 0.97 to 0.98 eV is known as the secondary ionized Zn vacancy ($V_{Zn}^{2-}$) or oxygen vacancy (VO) defect energy level.

Figure 10A:
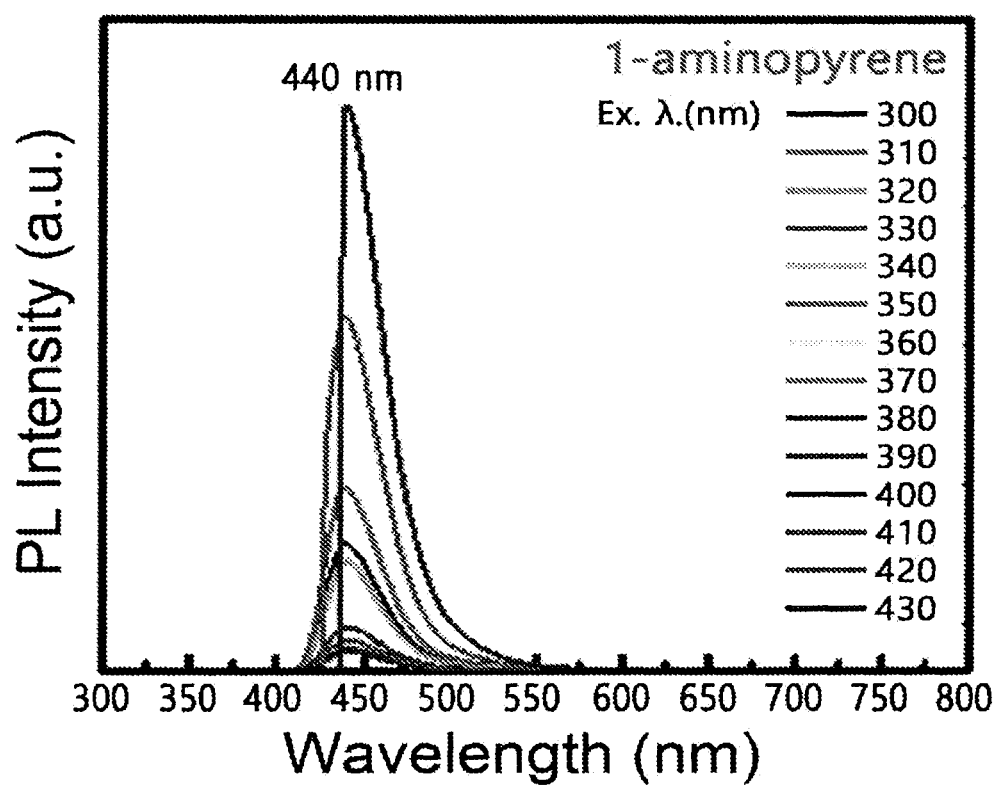
FIG. 10A illustrates an emission curve of 1-aminopyrene.

FIG. 10A illustrates an emission curve of the 1-aminopyrene. As illustrated in FIG. 10A, the maximum emission intensity is observed at excitation wavelengths of 430 nm, 420 nm, and 310 nm in the order of 430 nm, 420 nm, and 310 nm. It was observed that the blue light emission was dominant at the excitation wavelength below the bandgap (sub-$E_g$) rather than at the excitation wavelength above the bandgap (Super-$E_g$), and as for the emission center, blue emission (440 nm) was the central wavelength, and the full width at half maximum (FWHM) was about 50 to 52 nm.

Figure 10B:
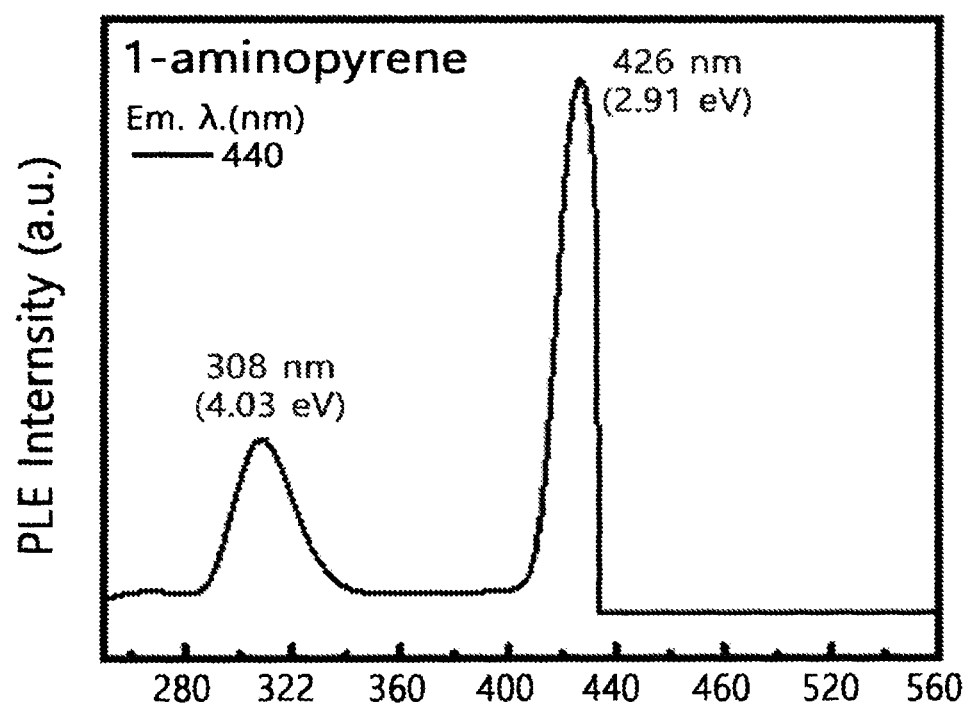
FIG. 10B illustrates a Gaussian fitting result for a PLE curve at a detection wavelength of 440 nm.
Figure 11:
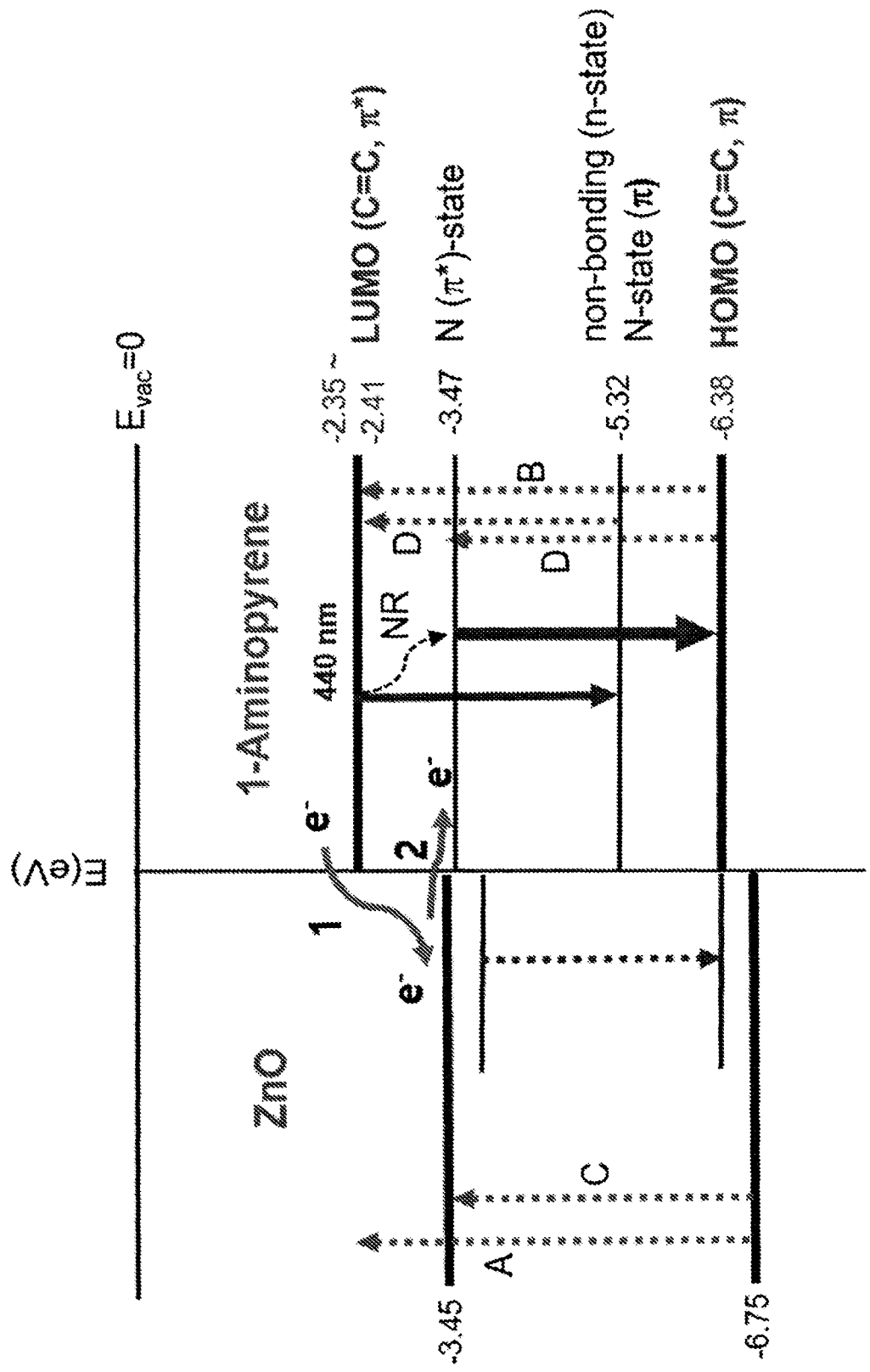
FIG. 11 is a schematic reference diagram of an electron energy level of ZnO@1-aminopyrene core-shell quantum dots.

FIG. 10B illustrates a PLE curve for the detection wavelength $\lambda_{Det}$=440 nm, to which two energy levels, 308 nm (=4.03 eV) and 426 nm (=2.91 eV), contribute. As illustrated in FIG. 11, it well matches with the absorption from HOMO (C=C, π) (−6.38 eV) and the bonding orbital (−5.32 eV) of the non-bonding state to LUMO (C=C, π*) (−2.35 to 2.41 eV). Therefore, 440 nm blue light emission is well explained by the electronic transition from LUMO (−2.38 eV to −2.41 eV) to the bonding orbital (π) energy level (−5.32 eV) of the non-binding state, or from the anti-bonding orbital (π*) energy level (−3.47 eV) of the non-bonding state to the HOMO energy level (−6.38 eV).

Therefore, the electron energy level of the ZnO@1-aminopyrene core-shell quantum dots having the quasi-Type II structure as illustrated in FIG. 11 can be predicted from the results obtained by the above-described emission spectrum and ultraviolet photoelectric spectroscopy.

Figure 12A:
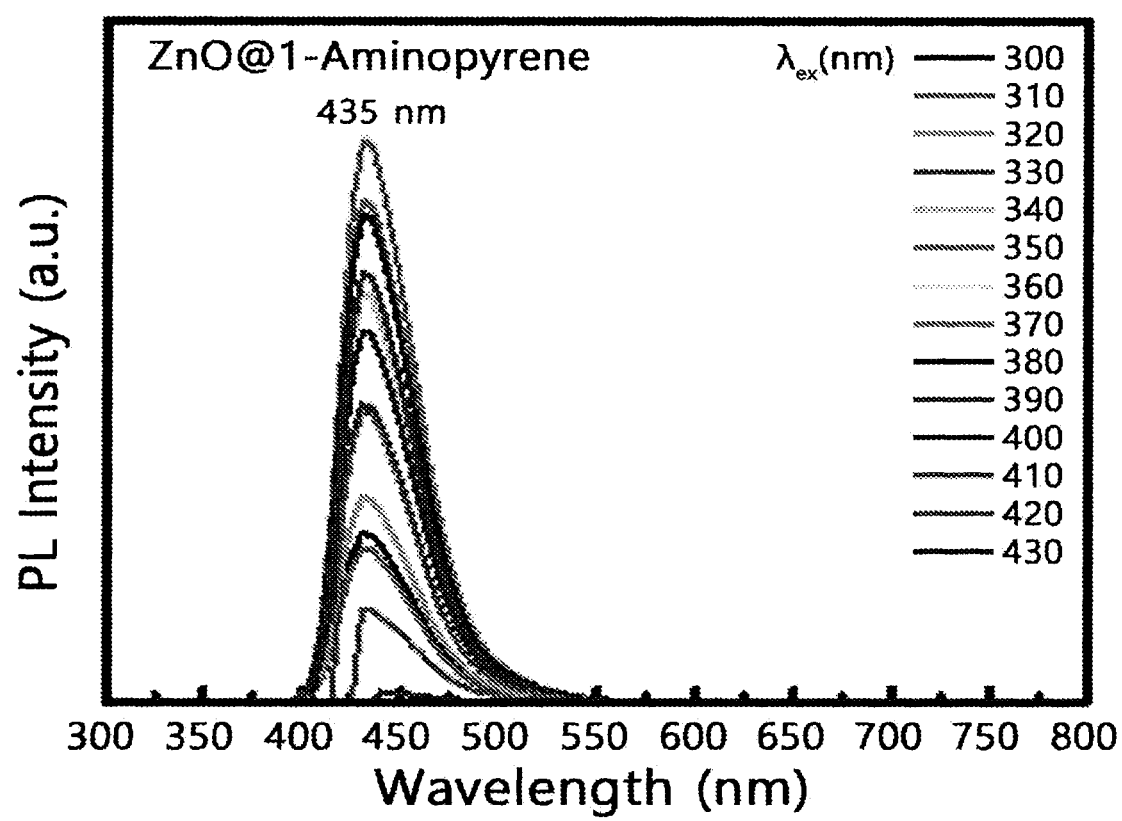
FIG. 12A illustrates a light emission curve of ZnO@1-aminopyrene core-shell quantum dots.
Figure 12B:
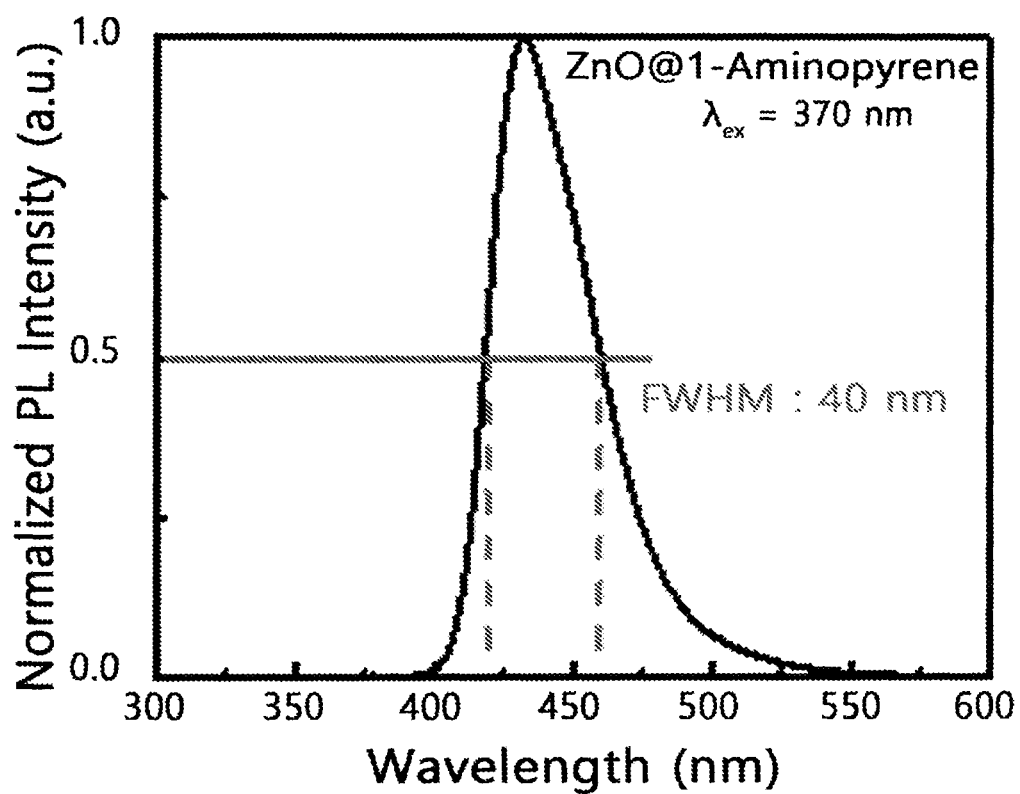
FIG. 12B illustrates a full-width at half maximum of an emission curve at an excitation wavelength of 370 nm.
Figure 12C:
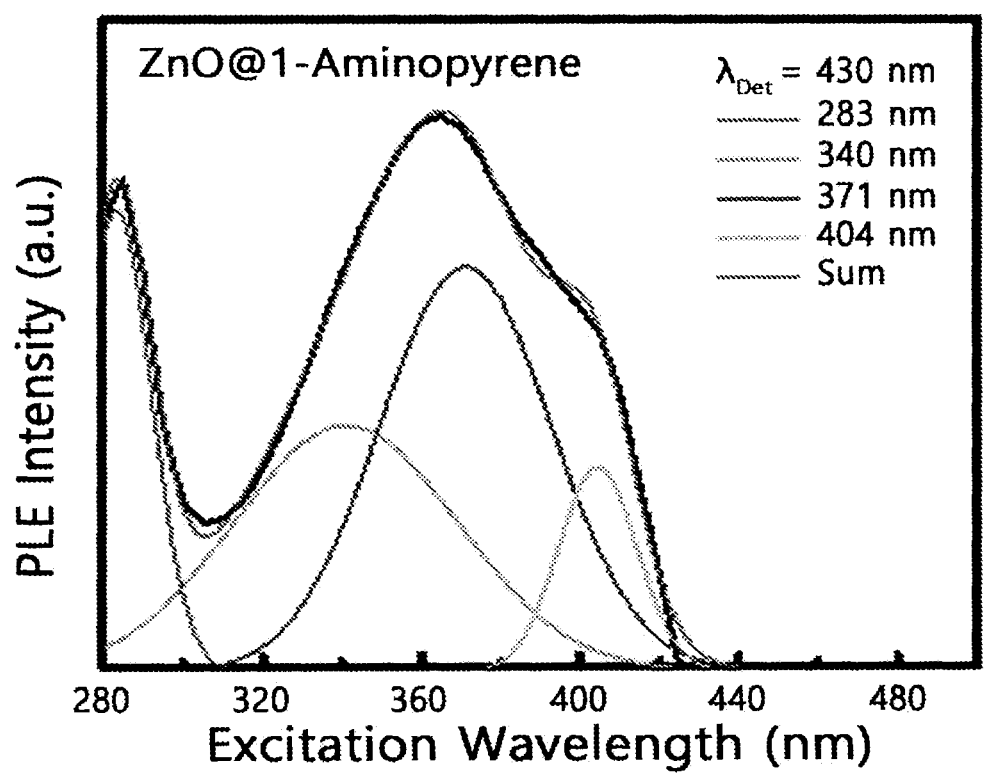
FIG. 12C illustrates a Gaussian fitting result of a PLE curve at a detection wavelength of 430 nm.

FIG. 12A illustrates an emission curve of ZnO@ aminopyrene quantum dots. As illustrated in FIG. 12A, as the excitation wavelength increases from 300 nm, blue light emission centered at about 435 nm is observed, and the light emission intensity increases similarly, showing the maximum light emission intensity at 360 nm. After that, it gradually decreases and is well observed up to 420 nm, and shows almost weak intensity at the excitation wavelength of 430 nm. Referring to FIG. 12B, the FWHM of blue light emission (430 nm) at an excitation wavelength of 370 nm was about 40 nm, which was smaller than 50 to 52 nm of the 1-aminopyrene. FIG. 12C illustrates the PLE curve for the detection wavelength $\lambda_{Det}$=430 nm, resulting from 283 nm (=4.38 eV), 340 nm (=3.64 eV), 371 nm (=3.34 eV), and 404 nm (=3.06 eV), respectively.

In FIG. 12C, 283 nm (=4.38 eV), 340 nm (=3.64 eV), 371 nm (=3.34 eV), and 404 nm (=3.06 eV) correspond to the absorption between the energy levels indicated as A, B, C, and D in FIG. 11, respectively. Therefore, in the blue light emission of ZnO@1-aminopyrene near 435 nm, the charge of the electrons photoexcited to the LUMO of 1-aminopyrene transfers to the conduction band (CB) of ZnO (Process 1, see FIG. 11), and accordingly, the emission of visible light inside ZnO is quenched, and the charge is transferred to −3.47 eV (process 2, see FIG. 11), which is the anti-bonding orbital energy level of the non-bonding state, which is a similar energy level over time, and it is well explained by the mechanism in which emission is occurred while the moved electrons transition to the HOMO energy level (−6.38 eV). Therefore, it can be seen that the ZnO@1-aminopyrene has the quasi-Type II core-shell quantum dot structure, and light emission is generated in the 1-aminopyrene, which is a shell.

Figure 13A:
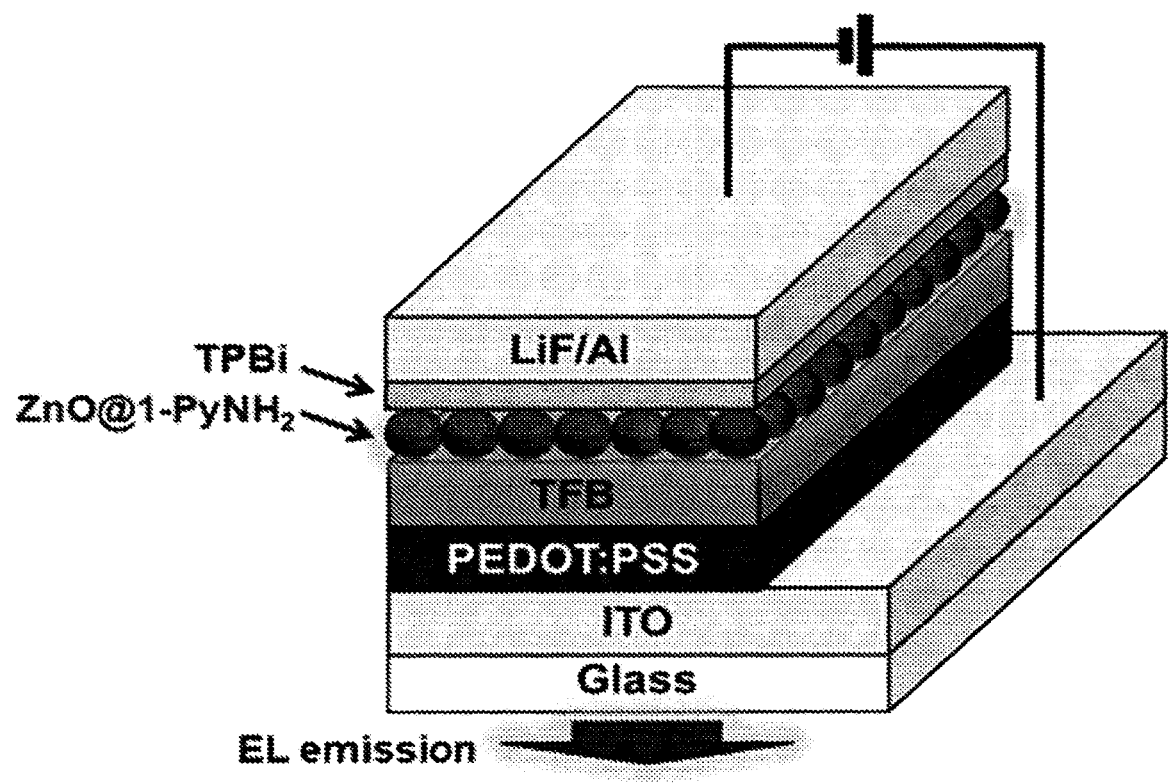
FIG. 13A is a schematic diagram of blue color QLEDs using ZnO@1-aminopyrene core-shell quantum dots prepared according to Experimental Example 5.

Experimental Example 5: Preparation of Blue Color QLEDs Using ZnO@1-Aminopyrene Core-Shell Quantum Dots Light emitting diodes (QLEDs) were manufactured using the ZnO@1-aminopyrene core-shell quantum dots prepared in Experimental Example 2 as a blue light-emitting layer (see FIG. 13A). On a glass substrate (glass/ITO) provided with an ITO pattern, a hole injection layer (HIL), PEDOT: PSS (Poly(3,4-ethylenedioxythiophene): poly(styrene-sulfonate)) and a hole transfer layer (HTL), TFB (Poly [(9,9-dioctylfluorenyl-2,7-diyl)-co-(4,4'-(N-(4-sec-butylphenyl)diphenylamine)]) were sequentially stacked using spin coating. Subsequently, the ZnO@1-aminopyrene core-shell quantum dots prepared in Experimental Example 2 were stacked on a hole transfer layer (HTL), TFB, by spin coating as a blue light-emitting layer (EML). Then, TPBi (2,2',2-(1,3,5-Benzinetriyl)-tris(1-pheny-1-H-benzimida-zole)) (C45H30N6), an electron transport layer (ETL), was vacuum deposited on the ZnO@1-aminopyrene core-shell quantum dots, and LiF/Al, an electrode layer, was stacked on the TPBi through vacuum deposition.

Figure 13B:
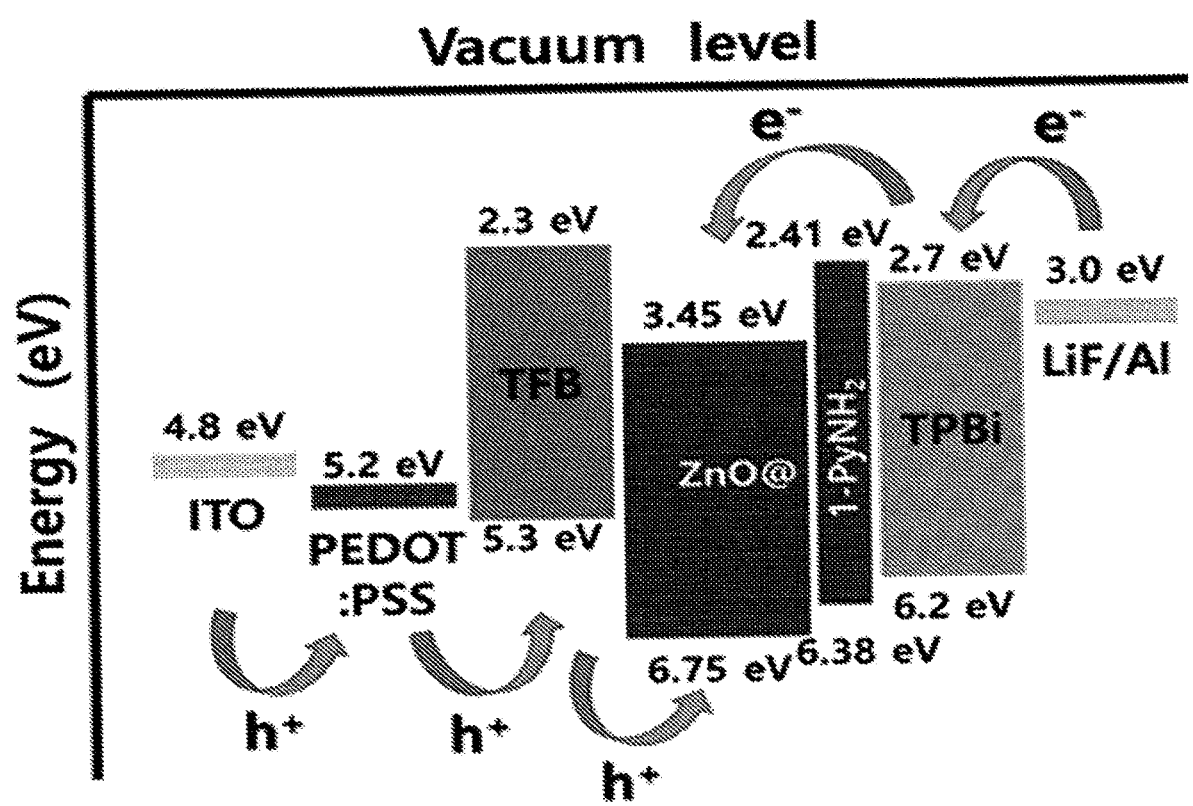
FIG. 13B illustrates an electron energy level of blue color QLEDs prepared according to Experimental Example 5.

In the electron energy level of the blue QLEDs manufactured by Experimental Example 5, as illustrated in FIG. 13B, since the work function of ITO is 4.8 eV, which is smaller than the work function of PEDOT: PSS, 5.2 eV, holes are injected into the PEDOT: PSS layer from the ITO layer, and holes move to the valence band (5.3 eV) of TFB, which is the HTL layer, and move to the valence band (6.75 eV) of ZnO. Meanwhile, electrons injected from the cathode of LiF/Al (work function: 3.0 eV) pass through the conduction band (2.7 eV) of TPBi, which is an ETL, and pass through the LUMO level (2.41 eV) of the 1-aminopyrene (1-PyNH$_2$), and reach the ZnO conduction band (3.45 eV).

Figure 14A:
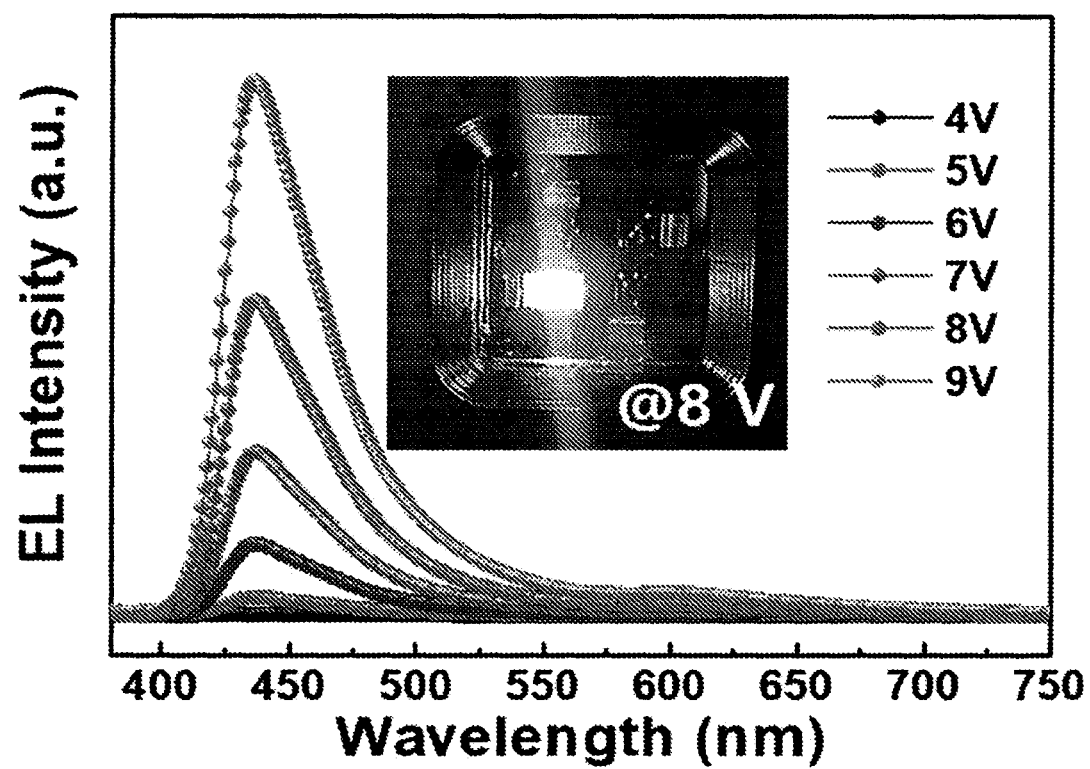
FIGS. 14A and 14B illustrate electroluminescence curves of blue color QLEDs prepared according to Experimental Example 5.
Figure 14B:
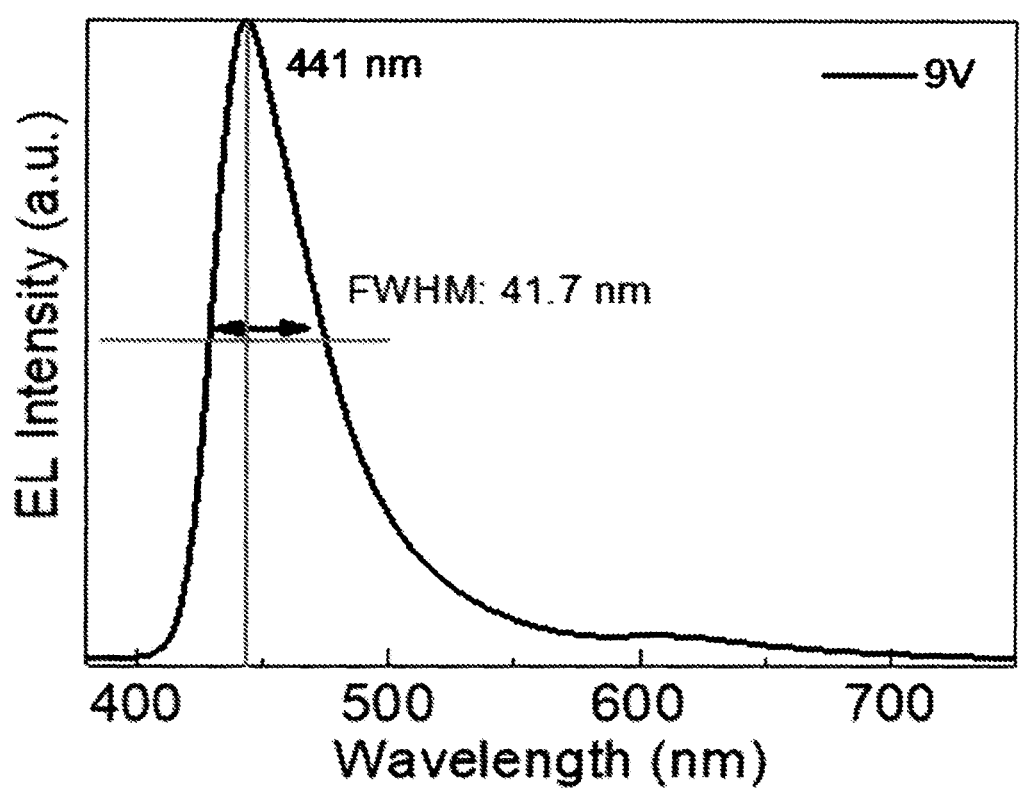

Experimental Example 6: Analysis of Emission Property of Blue QLEDs Using ZnO@1-Aminopyrene Core-Shell Quantum Dots FIG. 14A illustrates an electroluminescence (EL) curve measured while applying a forward voltage in the range of 4V to 9V in a state in which a (+) pole is connected to ITO and a (−) pole is connected to LiF/Al. As illustrated in FIG. 14B, the EL center wavelength was 441 nm, and the full width at half maximum (FWHM) was measured to be 41.7 nm. Here, a photograph illustrated in FIG. 14A is a photograph showing a blue light emission state when a voltage of 8V is applied.

Figure 15:
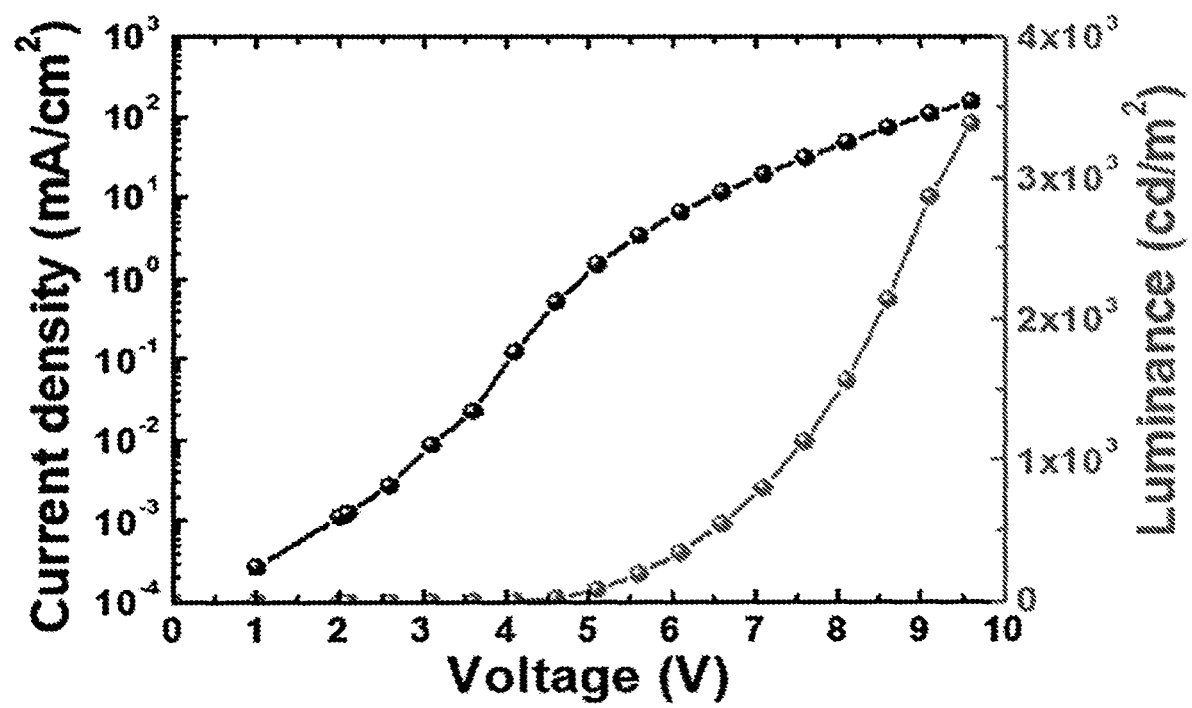
FIG. 15 illustrates current density and luminance measurement curve of blue color QLEDs prepared according to Experimental Example 5.

FIG. 15 illustrates current density and luminance measurement curve of the ZnO@1-aminopyrene core-shell quantum dot QLEDs measured when voltage is applied. Referring to FIG. 15, it shows a current density value of about 100 mA/cm$^2$ or more from the applied voltage of 8 V or more, and luminance (cd/m$^2$) seems to be observable from the applied voltage of about 4.5. a maximum luminance value of about 3379 cd/m$^2$, which was a high luminance value, was measured with was measured at a voltage of about 9.1 V.

Figure 16:
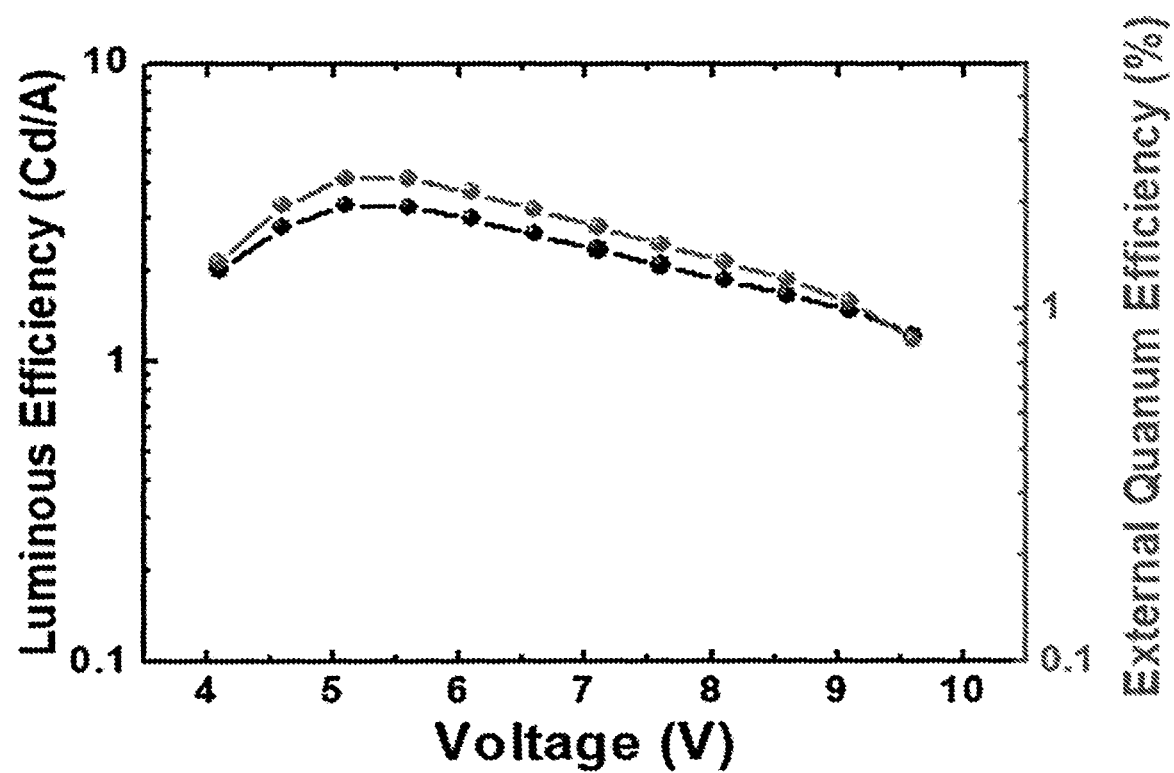
FIG. 16 illustrates luminous efficacy and external quantum efficiency of blue color QLEDs prepared according to Experimental Example 5.

In the luminous efficacy (cd/A) and external quantum efficiency (%) (see FIG. 16), the luminous efficacy of 3.32 cd/A was measured under the applied voltage of 5V, and the external quantum efficiency was measured at 2.35%.

Figure 17A:
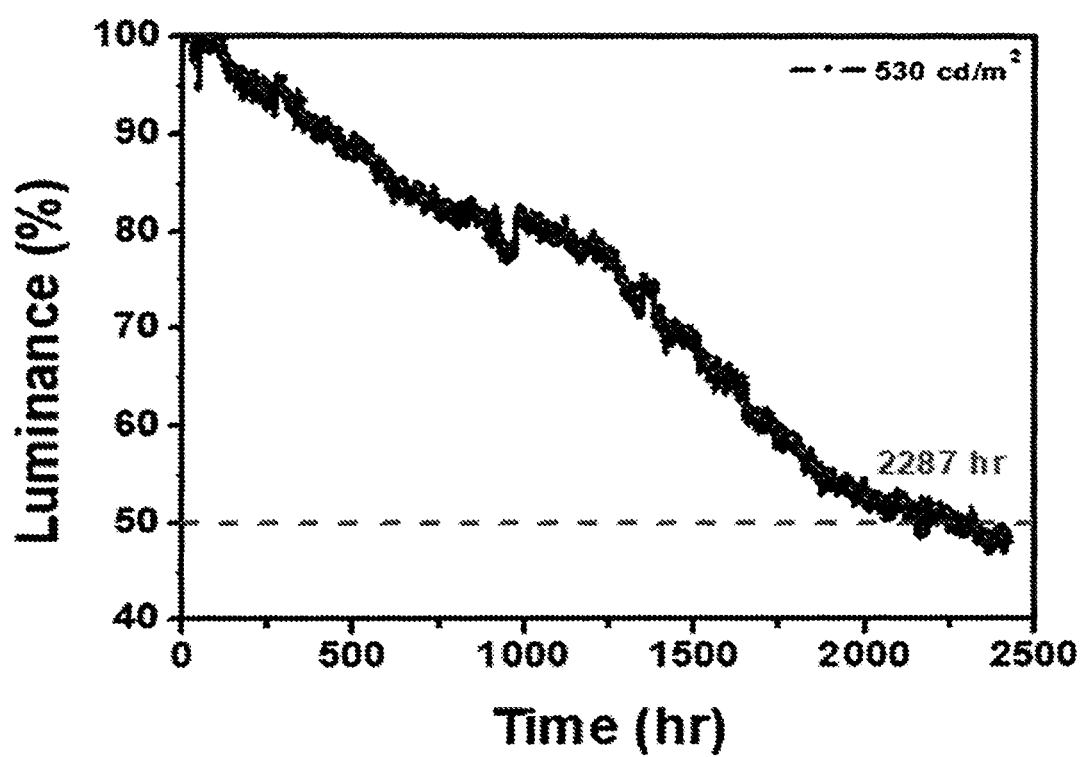
FIGS. 17A, 17B, and 17C each illustrate a result of measuring $T_{50}$, time required to decrease an initial luminance value by 50% while the initial luminance value is fixed at 530 cd/m$^2$ (a), 980 cd/m$^2$ (b), and 1340 cd/m$^2$ (c).
Figure 17B:
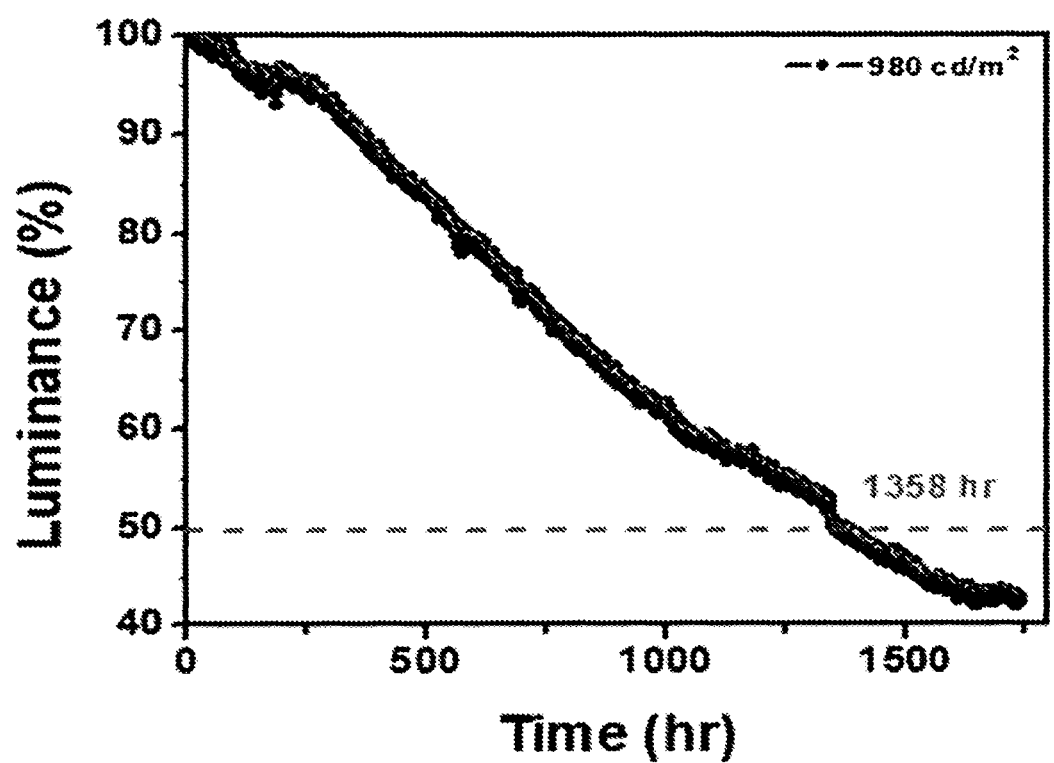
Figure 17C:
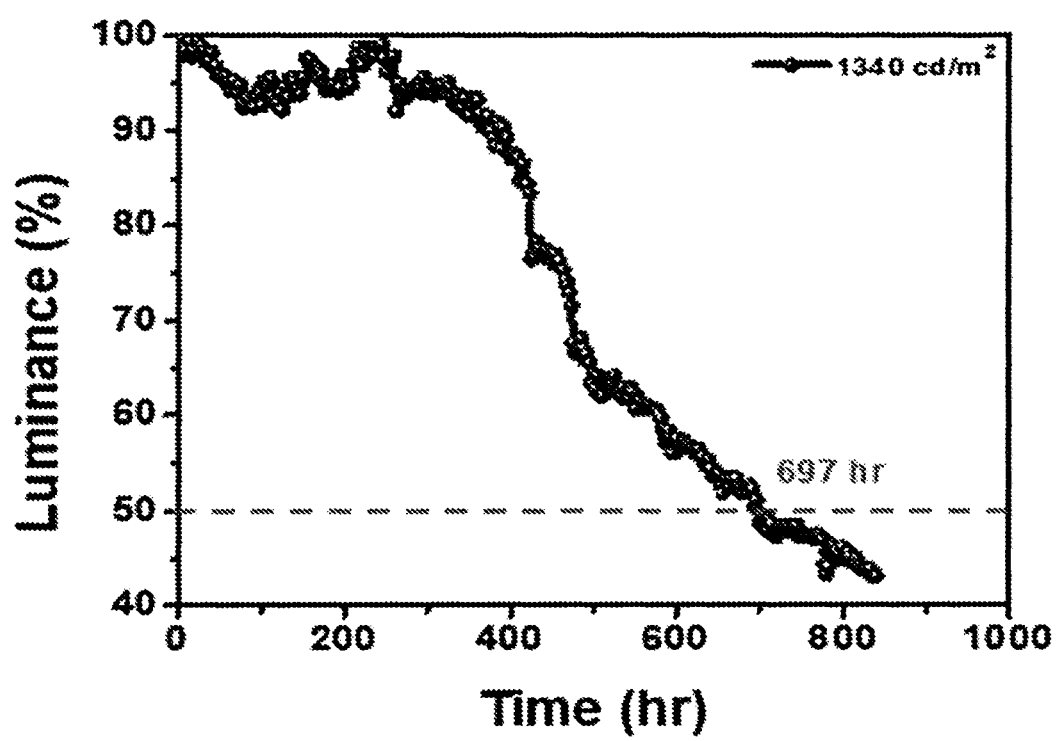
Figure 17D:
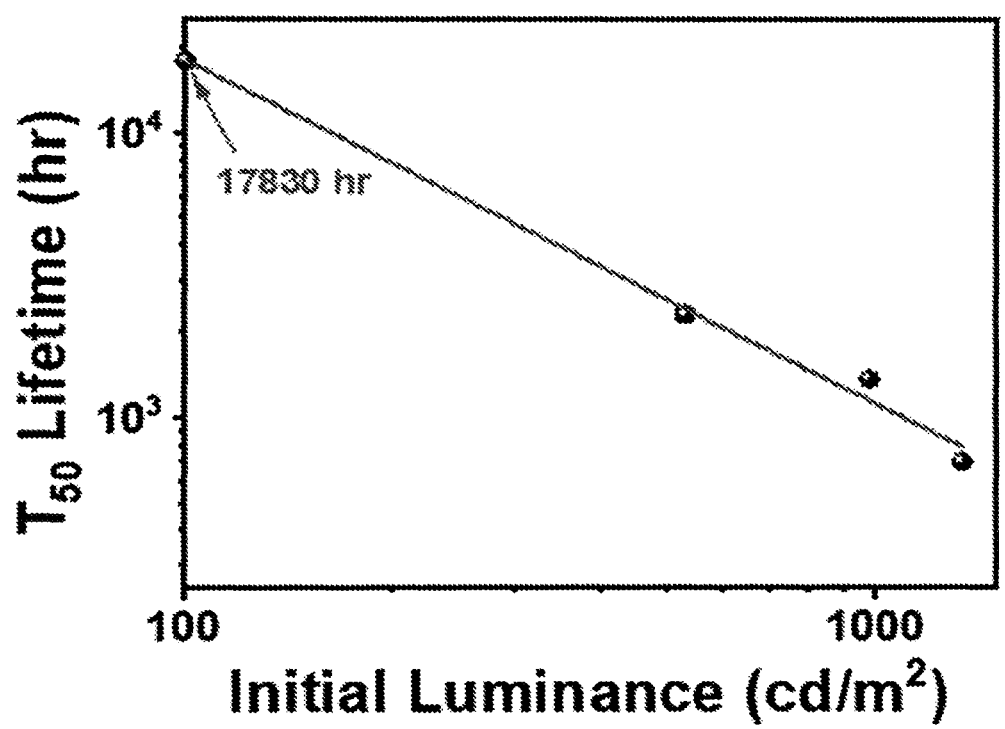
FIG. 17D illustrates a result of calculating $T_{50}$ of blue color QLEDs prepared according to Experimental Example 5.

FIGS. 17A, 17B, and 17C each illustrate the result of measuring $T_{50}$, the time required to decrease an initial luminance value by 50% while the initial luminance value is fixed at 530 cd/m$^2$ (a), 980 cd/m$^2$ (b), and 1340 cd/m$^2$ (c), and the respective $T_{50}$ were measured to 2287 hours, 1358 hours, 697 hours. In general, the lifetime of QLEDs is expressed as $T_{50}$ at an initial luminance value of 100 cd/m$^2$, which can be predicted using the empirical formula, $L_0^n \times T_{50}$=constant relationship, and the result is illustrated in FIG. 17D. In the above empirical formula, $L_0$ is an initial luminance value, and n is an acceleration factor value.

From the results of FIGS. 17A, 17B and 17C, n was determined 1.2, and $T_{50}$ was calculated to be 17,830 hours at an initial luminance value of 100 cd/m$^2$ by extrapolation (see FIG. 17D). The result that $T_{50}$ is 17,830 hours at the initial luminance value of 100 cd/m$^2$ is the best lifetime property among blue light-emitting QLEDs using Cd, In, ZnSe, CdSeS, etc., which have been reported so far. Specifically, it is known that blue light-emitting QLEDs to which CdSeS is applied have the best lifetime property with $T_{50}$=10,000 hours, and the blue light-emitting QLEDs to which the ZnO@1-aminopyrene core-shell quantum dots of the disclosure are applied has the long lifetime of $T_{50}$=17,830 hours, which far exceeds $T_{50}$=10,000 hours.

What is claimed is:

1. A light emitting diode using a zinc oxide-aminopyrene core-shell quantum dot, comprising a blue light-emitting layer of a ZnO@1-aminopyrene quantum dot, wherein the ZnO@1-aminopyrene quantum dot has a core-shell structure in which a ZnO quantum dot form a core and a 1-aminopyrene forms a shell.

2. The light-emitting diode of claim 1, wherein the ZnO@1-aminopyrene quantum dot has a quasi-Type II structure, and an unoccupied molecular orbital (LUMO) of the 1-aminopyrene has a higher energy level than a conduction band (CB) of the ZnO, and an occupied molecular orbital (HOMO) of the 1-aminopyrene has a higher energy level than a valence band (VB) of the ZnO.

3. The light-emitting diode of claim 1, wherein the 1-Aminopyrene has an energy band gap ($E_g$) between the unoccupied molecular orbital (LUMO) and the occupied molecular orbital (HOMO) of 2.5 eV or more.

4. The light-emitting diode of claim 1, wherein when the ZnO@1-aminopyrene quantum dot is irradiated with light, photoexcited electron moves from the ZnO quantum dot to the 1-aminopyrene, and electronic transition occurs within the 1-aminopyrene to generate blue light emission.

5. The light-emitting diode of claim 1, wherein a hole injection layer (HIL), a hole transfer layer (HTL), a blue light-emitting layer (EML), and an electron transport layer (ETL) are sequentially stacked on a first electrode of a glass substrate, and a second electrode is formed on the electron transport layer (ETL),
the blue light-emitting layer (EML) is composed of the ZnO@1-aminopyrene quantum dot of the core-shell structure.

6. The light-emitting diode of claim 1, wherein $T_{50}$, which is time required for an initial luminance value of 100 cd/m$^2$ to decrease by 50%, is 10,000 hours or more.

* * * * *